(12) United States Patent
Cook

(10) Patent No.: US 10,431,890 B2
(45) Date of Patent: Oct. 1, 2019

(54) MULTI-BAND TRANSMIT/RECEIVE FEED UTILIZING PCBS IN AN AIR DIELECTRIC DIPLEXING ASSEMBLY

(71) Applicant: Scott John Cook, Woodstock, GA (US)

(72) Inventor: Scott John Cook, Woodstock, GA (US)

(73) Assignee: Scott John Cook, Woodstock, GA (US)

( * ) Notice: Subject to any disclaimer, the term of this patent is extended or adjusted under 35 U.S.C. 154(b) by 144 days.

(21) Appl. No.: 15/588,279

(22) Filed: May 5, 2017

(65) Prior Publication Data

US 2017/0324164 A1    Nov. 9, 2017

Related U.S. Application Data

(60) Provisional application No. 62/333,519, filed on May 9, 2016.

(51) Int. Cl.

| | | |
|---|---|---|
| *H01P 1/17* | (2006.01) | |
| *H01P 3/08* | (2006.01) | |
| *H01Q 1/38* | (2006.01) | |
| *H01Q 5/47* | (2015.01) | |
| *H01Q 5/55* | (2015.01) | |
| *H04B 1/00* | (2006.01) | |
| *H01Q 13/02* | (2006.01) | |
| *H01Q 13/20* | (2006.01) | |

(Continued)

(52) U.S. Cl.
CPC .............. *H01Q 5/55* (2015.01); *H01P 1/171* (2013.01); *H01P 1/172* (2013.01); *H01P 1/173* (2013.01); *H01P 3/087* (2013.01); *H01Q 1/38* (2013.01); *H01Q 5/47* (2015.01); *H01Q 13/02* (2013.01); *H01Q 13/0208* (2013.01); *H01Q 13/0241* (2013.01); *H01Q 13/203* (2013.01); *H01Q 13/206* (2013.01); *H01Q 13/24* (2013.01); *H04B 7/1858* (2013.01); *H04B 7/18517* (2013.01); *H04B 1/0064* (2013.01)

(58) Field of Classification Search
CPC .......... H01Q 5/55; H01Q 1/38; H01Q 13/203; H01Q 13/206; H04B 1/0064; H04B 7/185517; H04B 7/1858
USPC ......................................................... 333/134
See application file for complete search history.

(56) References Cited

U.S. PATENT DOCUMENTS

2012/0188917 A1    7/2012    Knox
2014/0306847 A1    10/2014   Bevelacqua et al.

FOREIGN PATENT DOCUMENTS

JP    H08316868 A    11/1996

OTHER PUBLICATIONS

International Search Report and Written Opinion for corresponding application PCT/US2017/031643, dated Jul. 19, 2017—7 pages.

*Primary Examiner* — Robert J Pascal
*Assistant Examiner* — Kimberly E Glenn

(57) ABSTRACT

In one example an apparatus is provided. The apparatus includes a low frequency radiator, a high frequency radiator, a high frequency waveguide that carries high frequency bands to the high frequency radiator, a low frequency coaxial waveguide coupled to the high frequency waveguide in a coaxial structure, wherein the low frequency coaxial waveguide carries low frequency bands to the low frequency radiator and a low frequency combiner in communication with the low frequency coaxial waveguide, wherein the low frequency combiner comprises a circular low frequency waveguide and air dielectric transmission lines formed by air channels formed above and below a plurality of printed circuits in a metal housing.

19 Claims, 20 Drawing Sheets

(51) Int. Cl.
*H01Q 13/24* (2006.01)
*H04B 7/185* (2006.01)

ial Patent
MULTI-BAND TRANSMIT/RECEIVE FEED UTILIZING PCBS IN AN AIR DIELECTRIC DIPLEXING ASSEMBLY

CROSS REFERENCE TO RELATED APPLICATIONS

This application claims priority to U.S. Provisional Patent Application Ser. No. 62/333,519, filed May 9, 2016, which is herein incorporated by reference in its entirety.

The present disclosure relates generally to antennas and, more particularly, to a multi-band transmit and receive feed utilizing printed circuit boards in an air dielectric duplexing assembly.

BACKGROUND

With increasing demand for communication capacity, "multiple satellites" and "multi-band satellites" have been deployed at or very near the same orbital location (within 0.5 deg of one another). This is commonly referred to as "co-locating" the satellite services at a single satellite location. This has occurred at numerous satellite locations around the globe. Many of these "co-located" satellites are designed to transmit and/or receive large amounts of data (bandwidth) to and/or from ground systems.

The "co-located" satellites are used for both video and internet services for businesses, homes, and other applications. Co-locating satellite capacity has increased in popularity due to limitations of available satellite orbital locations and a desire to deploy single antenna ground stations that can serve multiple functions (including broad band video and internet services).

SUMMARY

According to aspects illustrated herein, there is provided an apparatus, comprising a low frequency radiator, a high frequency radiator, a high frequency waveguide that carries high frequency bands to the high frequency radiator, a low frequency coaxial waveguide coupled to the high frequency waveguide in a coaxial structure, wherein the low frequency coaxial waveguide carries low frequency bands to the low frequency radiator and a low frequency combiner in communication with the low frequency coaxial waveguide, wherein the low frequency combiner comprises a circular low frequency waveguide and air dielectric transmission lines formed by air channels formed above and below a plurality of printed circuits in a metal housing.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates to a multi-band transmit/receive feed utilizing printed circuits in an air dielectric diplexing assembly. As discussed above, co-locating satellite capacity has increased in popularity due to limitations of available satellite orbital locations and a desire to deploy single antenna ground stations that can serve multiple functions (including broad band video and Internet services).

One solution for ground systems is to use multiple ground antenna systems at a given ground location each designed for one, or maybe two, frequency bands. However, that is not desirable from a marketing (aesthetic), zoning, or cost perspective. So there is considerable demand for a single ground antenna system (as described in this disclosure) that is capable of receiving and transmitting all of the wanted bands from and to collocated satellites.

This gives rise to significant design challenges for the ground antenna system. The ground antenna system must transmit and receive broad band widths of data contained in multiple frequency bands to one satellite location. In addition, most of these signals are carried in two polarities. The ground systems must be able to combine (together) and/or diplex (separate) the various frequency bands and polarities. As with any satellite earth station system this must be accomplished in such a matter to minimize unwanted interference from and to other neighboring satellites.

In search of a solution several approaches have been developed in recent years but have had limited or no commercial success due to their cost, difficulty to manufacture, and/or compromised performance. The present disclosure addresses these issues.

Figure 1:
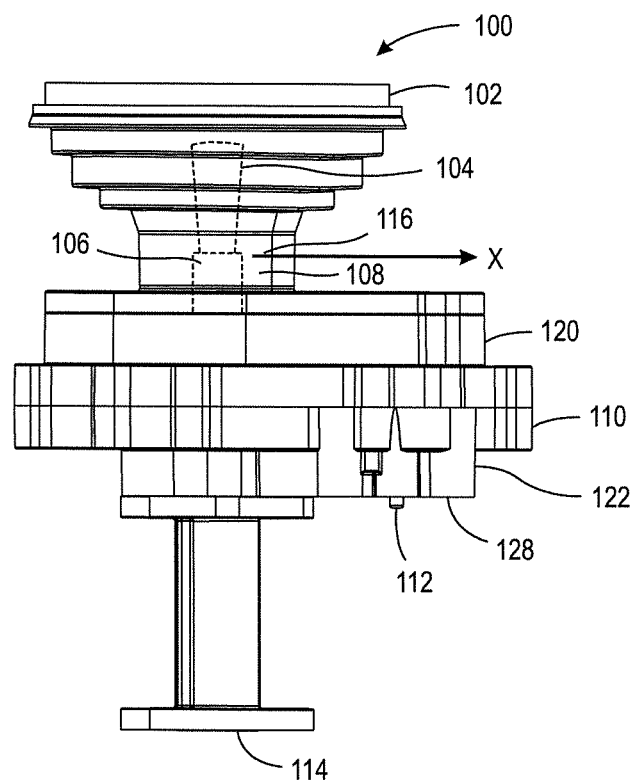
FIG. 1 illustrates a side view of an example multi-band transmit/receive feed of the present disclosure.

FIG. 1 illustrates a side view of an example multi-band transmit/receive feed 100 of the present disclosure. In one embodiment, the multi-band transmit/receive feed 100 includes a low frequency radiator 102, a high frequency radiator 104, a high frequency waveguide 106, a coaxial structure 108, a low frequency combiner 110 and a circular low frequency waveguide 128. Together these elements form a diplexer that separates low frequency band signals from high frequency band signals.

In one embodiment, the high frequency band signals (e.g., high frequency band A having a range of approximately 29.5 gigahertz (GHz) to 30 GHz and high frequency band B having a range of approximately 19.7 GHz to 20.2 GHz) are diplexed to and/or from a high frequency interface port 114. The low frequency band signals (e.g., low frequency band C having a range of approximately 10.7 GHz to 12.75 GHz) are transmitted to and/or from a low frequency interface port 112.

In one embodiment, the coaxial structure 108 may comprise the high frequency waveguide 106 and a low frequency coaxial waveguide 116. The high frequency waveguide 106 may be a small inner circular waveguide for high frequency bands. The low frequency coaxial waveguide 116 may be located around the high frequency waveguide 106 (e.g., in an annular arrangement) to form the coaxial structure 108. The low frequency coaxial waveguide 116 may be used for low frequency bands.

The relatively long small diameter of the high frequency waveguide 106 may carry high frequency bands between the high frequency interface port 114 and the high frequency radiator 104. In one embodiment, the high frequency radiator 104 may be a dielectric radiator, dielectric horn, or simple waveguide or horn. The high frequency waveguide 106 can be loaded with a dielectric material in order to reduce the waveguide size (e.g., a diameter) and/or to improve and enhance radiating characteristics.

The low frequency coaxial waveguide 106 may carry both polarities of lower frequency bands between the low frequency radiator 102 and the low frequency combiner 110. In one embodiment, the low frequency radiator 102 may be a circular corrugated horn.

Figure 2:
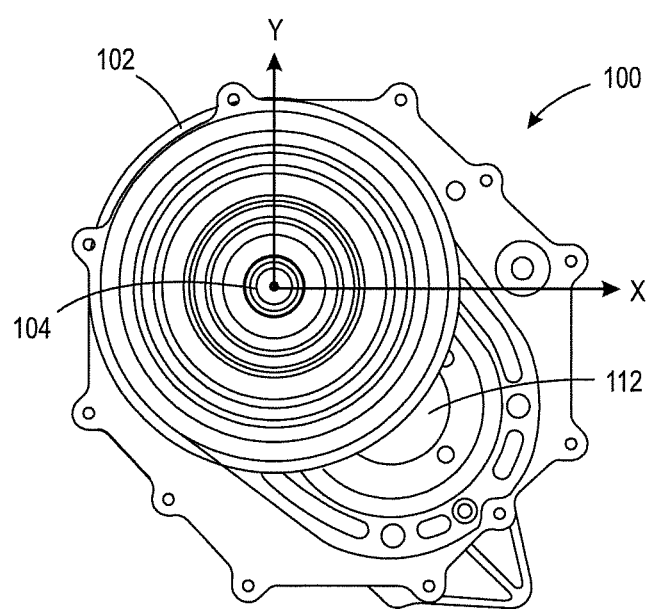
FIG. 2 illustrates a top view of the example multi-band transmit/receive feed of the present disclosure.
Figure 3:
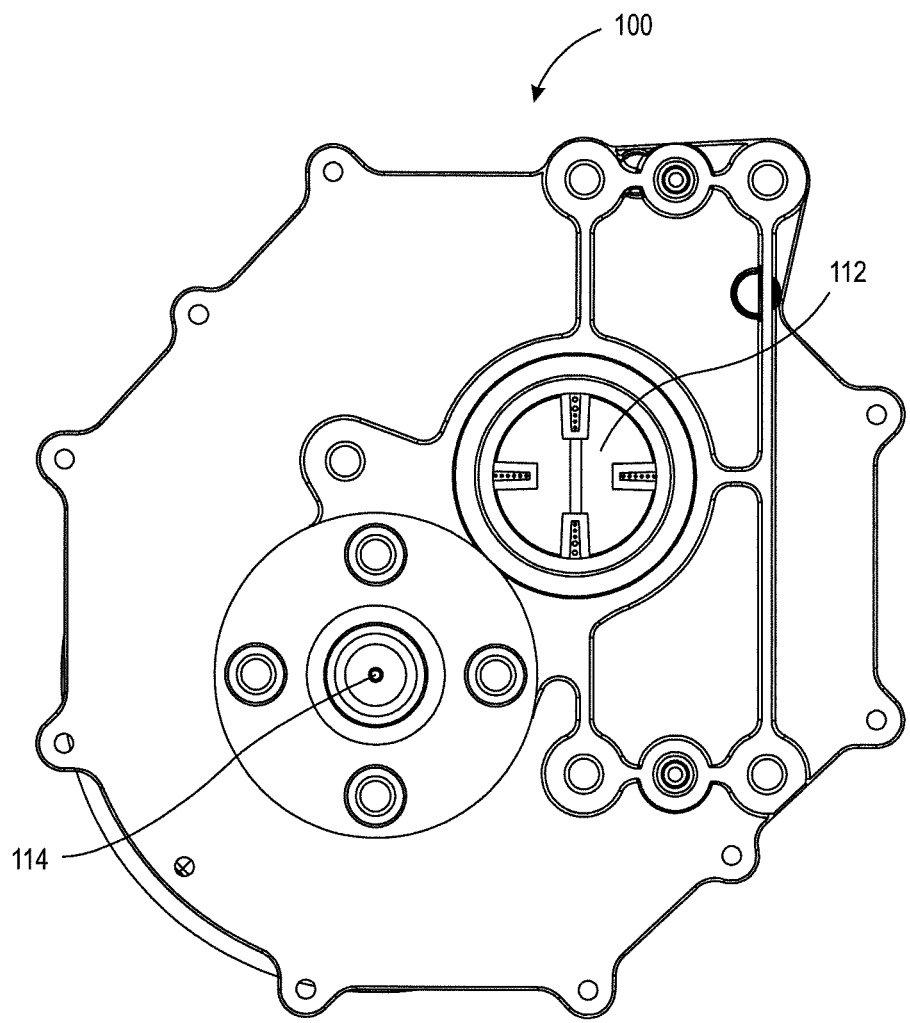
FIG. 3 illustrates a bottom view of the example multi-band transmit/receive feed of the present disclosure.
Figure 8:
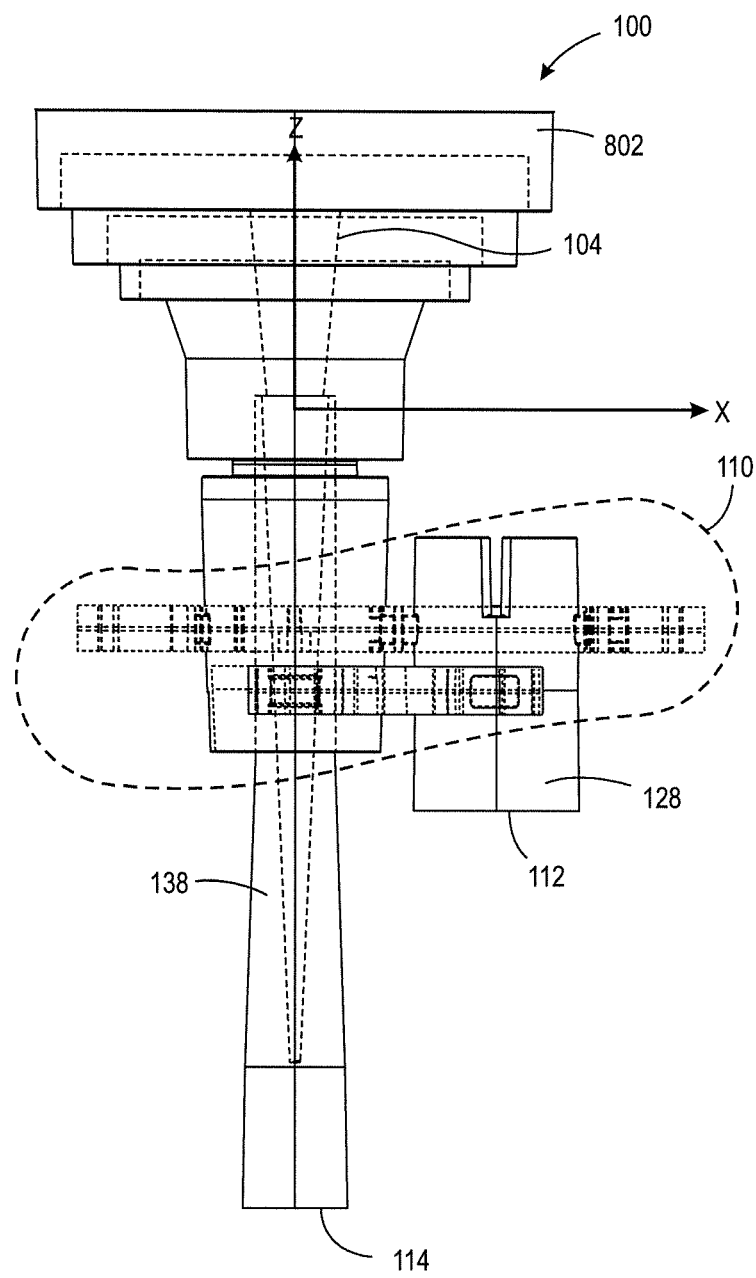
FIG. 8 illustrates a side view of the example multi-band transmit/receive feed of the present disclosure without a metal housing around a low frequency combiner.

In one embodiment, the low frequency combiner 110 may be enclosed by a metal housing that comprises a top metal housing portion 120 and a bottom metal housing portion 122. FIG. 8 illustrates a side view of the low frequency combiner 110 without the metal housing. FIG. 2 illustrates a top view of the example multi-band transmit/receive feed 100 of the present disclosure and FIG. 3 illustrates a bottom view of the example multi-band transmit/receive feed 100 of the present disclosure.

Figure 4:
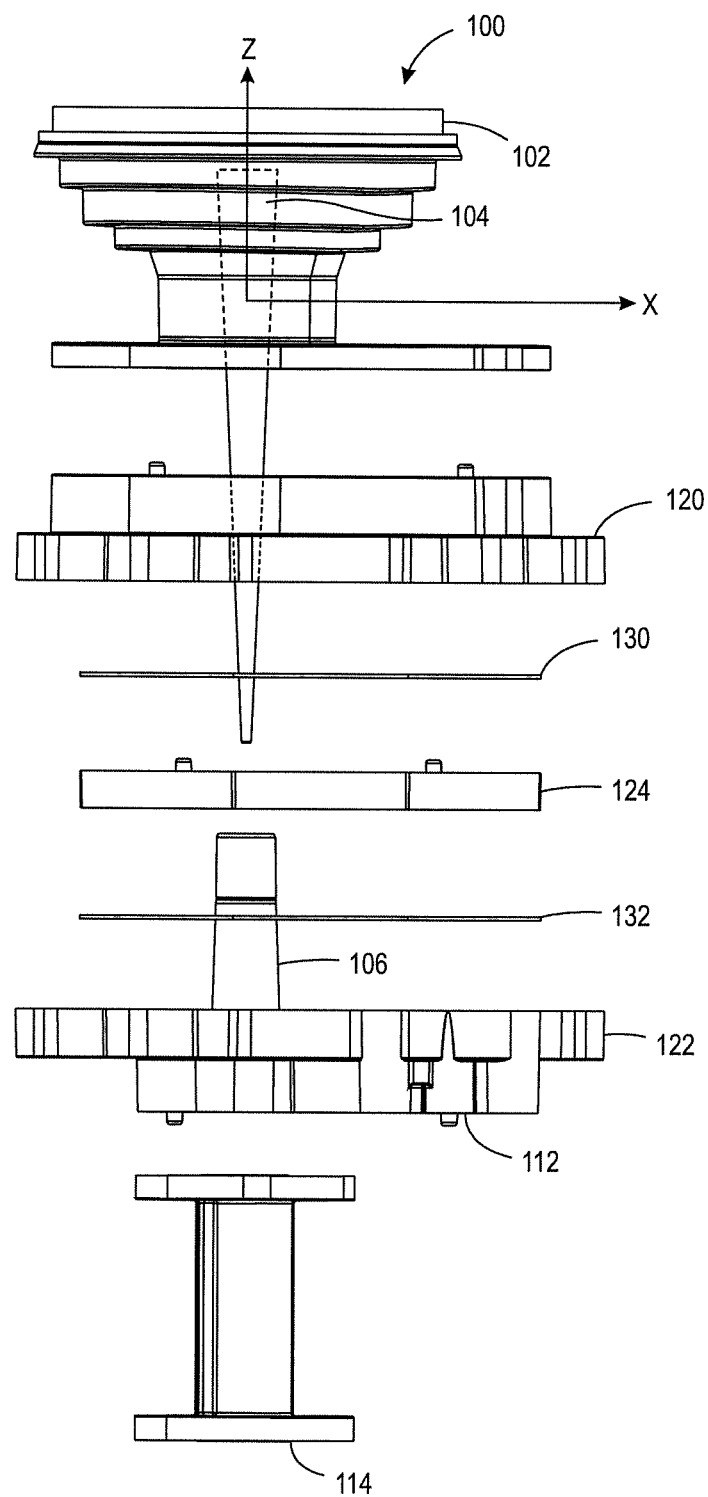
FIG. 4 illustrates an exploded side view of the example multi-band transmit/receive feed of the present disclosure.

FIG. 4 illustrates an exploded side view of the multi-band transmit/receive feed 100. In one embodiment, the low frequency combiner 110 may include a first printed circuit board (PCB) 130 and a second PCB 132. Although FIG. 4 illustrates the printed circuits on a PCB, it should be noted that the circuits may be printed on any type of medium including thin films commonly used in flexible printed circuits. Thus, the term PCB may generically refer to printed circuits that are printed on any type of medium including thin films.

In one embodiment, the metal housing may also include a middle metal housing portion 124. The first PCB 130 may be enclosed by the top metal housing portion 120 coupled to the middle metal housing portion 124. The second PCB 132 may be enclosed by the middle metal housing portion 124 coupled to the bottom metal housing portion 122.

Figure 5:
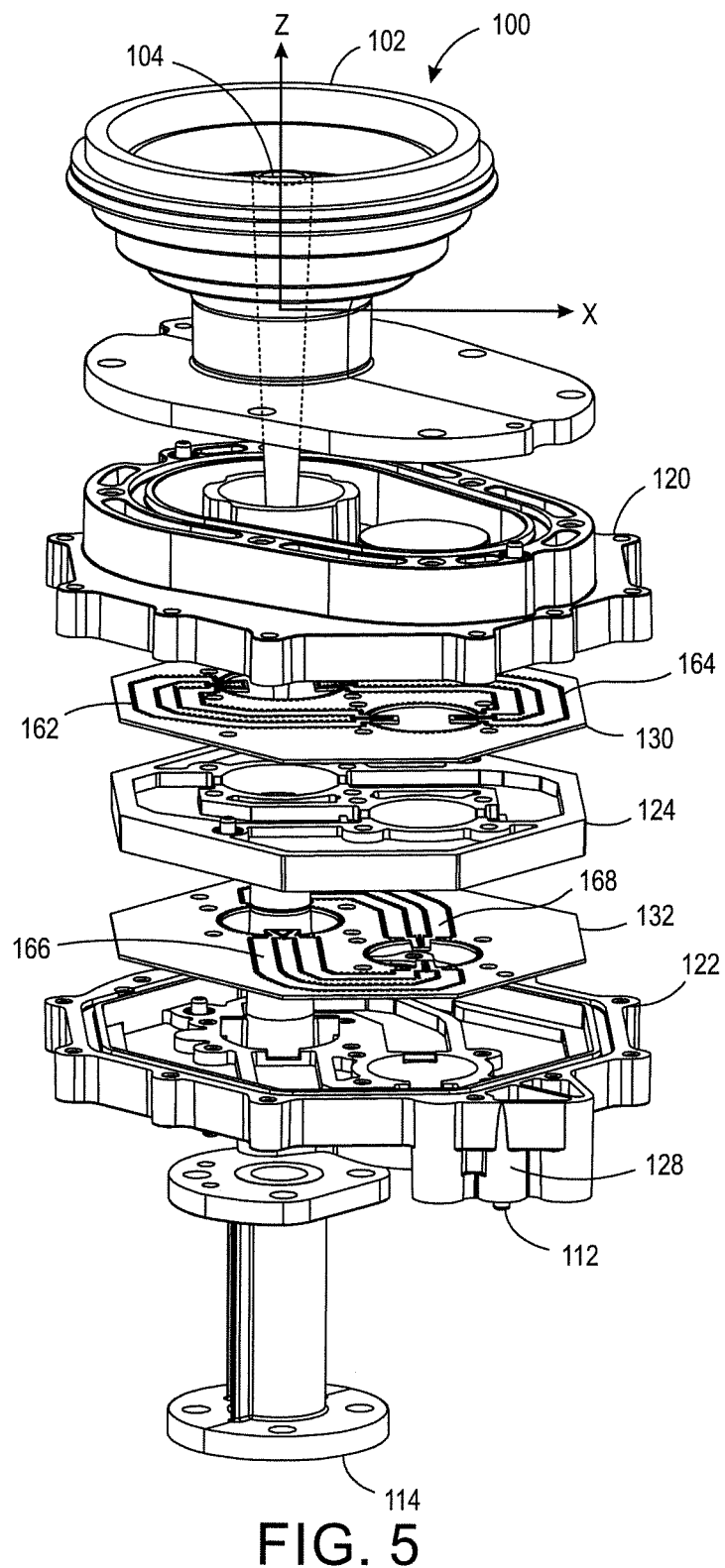
FIG. 5 illustrates an exploded isometric view of the example multi-band transmit/receive feed of the present disclosure.

FIG. 5 illustrates an exploded isometric view of the multi-band transmit/receive feed 100. The exploded isometric view in FIG. 5 illustrates a first trace 162 and a second trace 164 in the first PCB 130 and a third trace 166 and a fourth trace 168 in the second PCB 132. The first trace 162 is contained within a volume of a first channel 142 (illustrated in FIG. 7) formed by the metal housings 120 and 124. The second trace 164 is contained within a volume of a second channel 144 (illustrated in FIG. 7) formed by the metal housings 120 and 124. The third trace 166 is contained within a volume of a third channel 146 (illustrated in FIG. 7) formed by the metal housings 124 and 122. The fourth trace 168 is contained within a volume of a fourth channel 148 (illustrated in FIG. 7) formed by the metal housings 124 and 122. It should be noted that the terms "first," "second," "third," and "fourth" are used purely as labels to differentiate between the different channels. The terms "first," "second," "third," and "fourth" are not intended to connote any order or sequence.

In one embodiment, the low frequency combiner 110 may carry low frequency bands between the low frequency coaxial waveguide 116 and the circular low frequency waveguide 128. The circular low frequency waveguide 128 may carry the low frequency bands to and/or from the low frequency interface port 112. In one embodiment, the first PCB 130 may be positioned between the top metal housing portion 120, the middle metal housing portion 124, while the second PCB 132 may be positioned between the middle metal housing portion 124 and the bottom metal housing portion 122, as noted above.

Figure 6:
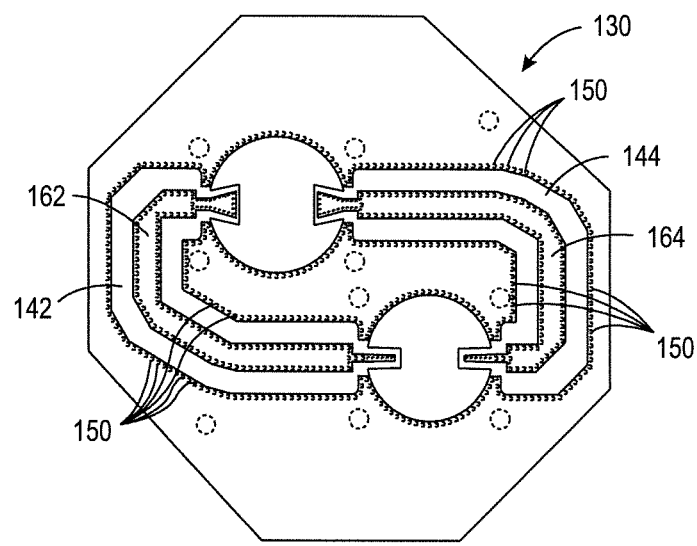
FIG. 6 illustrates a top view of an example printed circuit board (PCB) of the present disclosure.

FIG. 6 illustrates an example of the first PCB 130. It should be noted that the second PCB 130 may have similar features as the first PCB 130. In one embodiment, the first PCB 130 may include the first metal trace 162 and the second metal trace 164. In one embodiment, the first PCB 130 may also include a plurality of platted through vias 150 that align with the walls of an area that is associated with the first channel 142 and the second channel 144. In other words, the plurality of platted through vias 150 may follow a perimeter or an outline of the first channel 142 and the second channel 144.

In one embodiment, the PCB board of the first PCB 130 may extend outside of the first channel 142 and the second channel 144 as shown in FIG. 6. The platted through vias 150 may align with the walls of the first channel 142 and the second channel 144 to block and contain the low frequency band effectively. As a result, the plurality of platted through vias 150 may electrically extend the side walls of the first channel 142 and the second channel 144 in a "z" direction (e.g., out of the page in FIG. 6) to further constrain the signal path to within the boundaries of the side wall.

Figure 12:
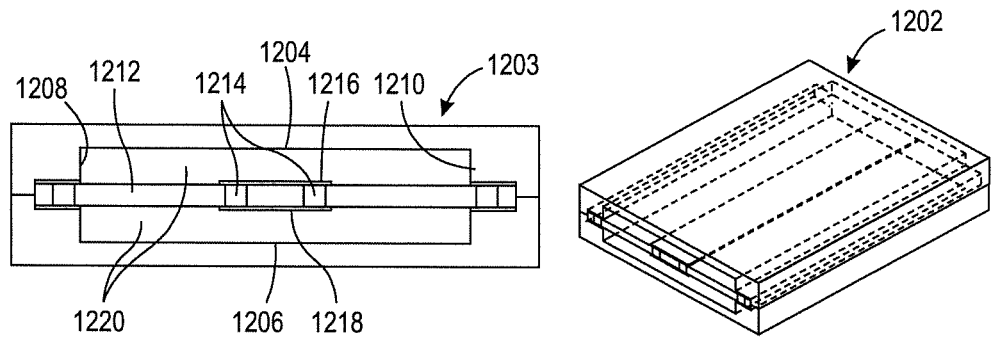
FIG. 12 illustrates a first example air dielectric transmission line.

In some embodiments, the plurality of platted through vias 150 may be used to connect a duplicate trace of the first metal trace 162 and the second metal trace 164 that are located on an opposite side of the first PCB 130. Similarly, the second PCB 132 may also include the plurality of platted through vias 150 that may be used to connect a duplicate trace of the third metal trace 166 and the fourth metal trace 168 that are located on the opposite side of the second PCB 132. An example of the traces on both sides of a printed circuit board that are connected by vias is shown in FIG. 12, and discussed in further detail below.

In some embodiments, the portions of the first PCB 130 around the area associated with the first channel 142 and the second channel 144 and portions of the second PCB 132 around the area associated with the third channel 146 and the fourth channel 148 can be eliminated while extending the channel walls in the "z" direction. As a result, the plurality of platted through vias 150 may be eliminated. Extending the channel walls in the "z" direction may be convenient for visualization of the signal path constraints and provide more efficient High Frequency Structure Simulator (HFSS) modeling of radio frequency (RF) performance.

Figure 9:
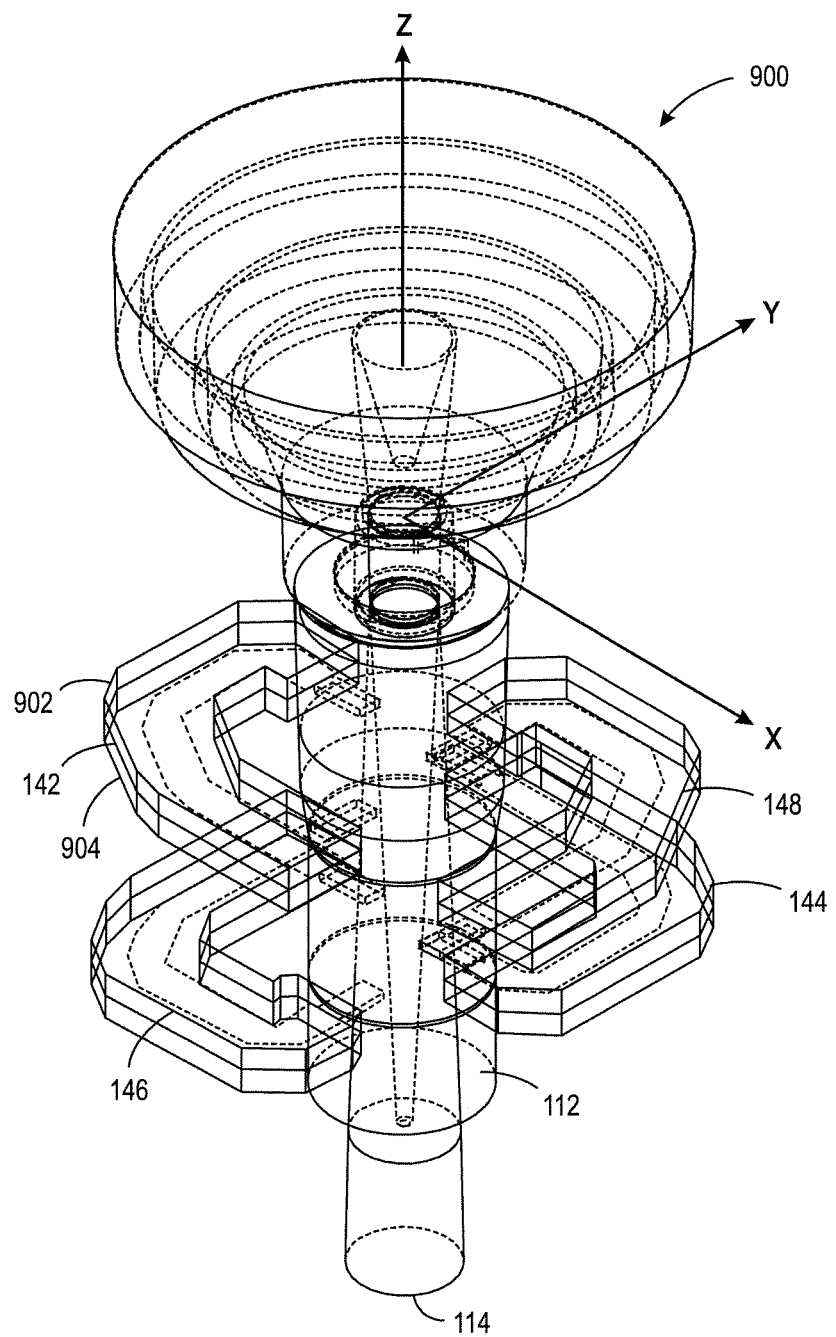
FIG. 9 illustrates an isometric view of the example multi-band transmit/receive feed of the present disclosure with channel walls extended in the "z" direction.

FIG. 9 illustrates an isometric view of an example multi-band transmit/receive feed 900 having a channel wall 902 and 904 extended to close the channels, as described above. FIG. 9 also illustrates the first channel 142, the second channel 144, the third channel 146 and the fourth channel 148 formed by the housings that enclose the metal traces.

Figure 7:
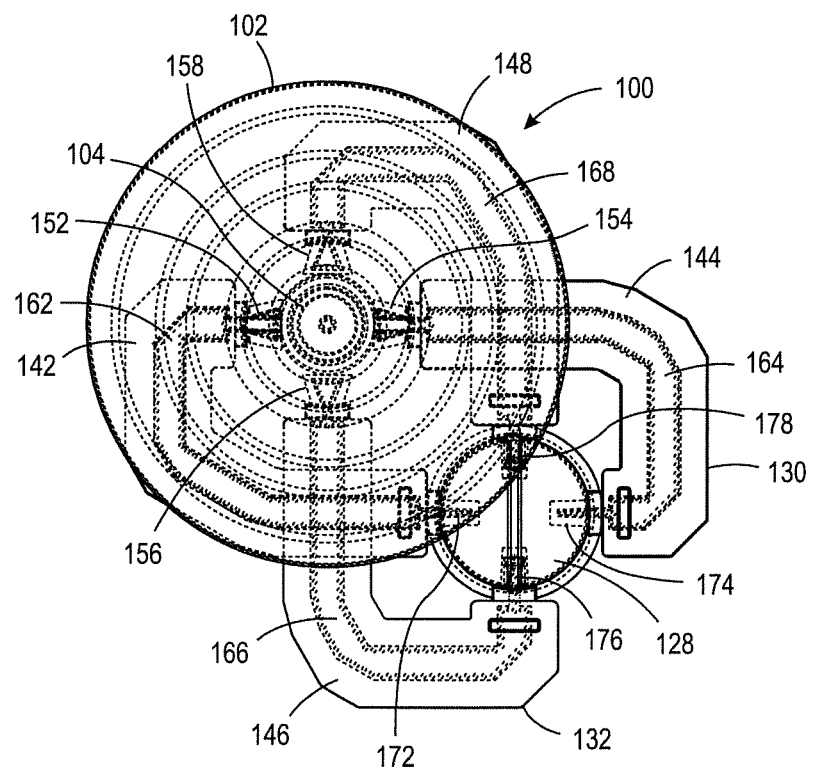
FIG. 7 illustrates a top view of a plurality of PCBs inside of the example multi-band transmit/receive feed of the present disclosure.

FIG. 7 illustrates a top view of the first PCB 130 and the second PCB 132 inside of the example multi-band transmit/receive feed 100. FIG. 7 illustrates the second PCB 132 having a third trace 166 in the third channel 146 and a fourth trace 168 in a fourth channel 148 of the second PCB 132. The second PCB 132 may also have a plurality of platted through vias 150 as shown in FIG. 7. FIG. 7 also illustrates the first channel 142, the second channel 144, the third channel 146, and the fourth channel 148 formed by the housings around the first metal trace 162, the second metal trace 164, the third metal trace 166, and the fourth metal trace 168, respectively.

Referring back to FIG. 5, in one embodiment, the first PCB 130 enclosed between the top metal housing portion 120 and the middle metal housing portion 124 may have hollowed out air channels above and below the first metal trace 162 and the second metal trace 164, such that the first PCB 130, the top metal housing portion 120 and the middle metal housing portion 124 together form air dielectric transmission lines. Similarly, the second PCB 132 enclosed between the middle metal housing portion 120 and the bottom metal housing portion 122 may have hollowed out air channels above and below the third metal trace 166 and the fourth metal trace 168, such that the second PCB 132, the middle metal housing portion 124 and the bottom metal housing portion 122 together may also form air dielectric transmission lines. For example, the air dielectric transmission lines may be formed by metal conductors (possibly printed circuit board traces) contained within air filled metal channels resulting in a low loss transmission line. Various different configurations of the air dielectric transmission lines are discussed in further detail below with reference to FIGS. 12-26.

In one embodiment, the first PCB 130 may be for a first polarity of the low frequency bands. In one embodiment, the second PCB 132 may be for a second polarity of the low frequency bands.

Referring back to FIG. 7, in one embodiment, the first PCB 130 for the first polarity has two signal paths supported by the first metal trace 162 and the second metal trace 164 contained in the first channel 142 and the second channel 144, respectively. On one end, the first metal trace 162 and the second metal trace 164 may enter the low frequency coaxial waveguide 116 on opposing sides using a first probe 152 and a second probe 154. On the other end the first metal trace 162 and the second metal trace 164 may enter the circular low frequency waveguide 128 on opposing sides with a third probe 172 and a fourth probe 174. In one embodiment, the first metal trace 162 and the second metal trace 164 may be electrically equal in length (e.g., an equal phase length) in order to preserve symmetric field excitation inside both the low frequency coaxial waveguide 116 and the circular low frequency waveguide 128.

Similarly, the second PCB 132 for the second polarity (which is orthogonal to the first polarity) has two signal paths supported by the third metal trace 166 and the fourth metal trace 168 contained in the third channel 146 and the fourth channel 148, respectively. On one end, the third metal trace 166 and the fourth metal trace 168 may enter the low frequency coaxial waveguide 116 on opposing sides using a fifth probe 156 and a sixth probe 158. On the other end, the third metal trace 166 and the fourth metal trace 168 may enter the circular low frequency waveguide 128 on opposing sides with a seventh probe 176 and an eighth probe 178. In one embodiment, the third metal trace 166 and the fourth metal trace 168 may be electrically equal in length (e.g., equal phase length) in order to preserve symmetric field excitation inside both the low frequency coaxial waveguide 116 and the circular low frequency waveguide 128.

In one embodiment, the first probe 152 and the second probe 154 may be located approximately 90 degrees relative to the fifth probe 156 and the sixth probe 158. Said another way, a line drawn between the first probe 152 and the second probe 154 may be perpendicular to a line drawn between the fifth probe 156 and the sixth probe 158. In one embodiment, the first probe 152, the second probe 154, the fifth probe 156 and the sixth probe 158 may be arranged around a perimeter of an opening. In one embodiment, the coaxial structure 108 may be located through the opening formed by the first probe 152, the second probe 154, the fifth probe 156 and the sixth probe 158.

In one embodiment, the third probe 172 and the fourth probe 174 may be located approximately 90 degrees relative to the seventh probe 176 and the eighth probe 178. Said another way, a line drawn between the third probe 172 and the fourth probe 174 may be perpendicular to a line drawn between the seventh probe 176 and the eighth probe 178. In one embodiment, the third probe 172, the fourth probe 174, the seventh probe 176 and the eighth probe 178 may be arranged around a perimeter of an opening. In one embodiment, the circular low frequency waveguide 128 may be located through the opening formed by the third probe 172, the fourth probe 174, the seventh probe 176 and the eighth probe 178.

In one embodiment, the first probe 152, the second probe 154, the third probe 172, the fourth probe 174, the fifth probe 156, the sixth probe 158, the seventh probe 176 and the eighth probe 178 may be printed probes. In other words, the first probe 152, the second probe 154, the third probe 172, the fourth probe 174, the fifth probe 156, the sixth probe 158, the seventh probe 176 and the eighth probe 178 may be printed into the first PCB 130 and the second PCB 132, respectively.

Although the cross-sections of the high frequency waveguide 106, the high frequency interface port 114, the low frequency waveguide 128 and the low frequency interface port 112 are shown in FIGS. 1-8 as being circular, it should be noted that the cross-sections may have a wide variety of shapes. Other example shapes of the cross sections of the high frequency waveguide 106, the high frequency interface port 114, the low frequency waveguide 128 and the low frequency interface port 112 may include an ellipse, a rectangular, a square, a hexagon, an octagon, any number of polygon, or a wide variety of oblong shapes. Furthermore the shape and/or aspect ratio of the cross section can change along the length of the waveguide.

In addition, although the cross-section of the outer diameter of the low frequency coaxial waveguide 116 is shown in FIGS. 1-8 as being circular, it should be noted that the cross section can be a wide variety of shapes. Example shapes of the cross section of the low frequency coaxial waveguide 116 may include an ellipse, a rectangular, a square, a hexagon, an octagon, any number of polygon, or a wide variety of oblong shapes. Furthermore the shape and/or aspect ratio of the cross section can change along the length of the waveguide.

Figure 10:
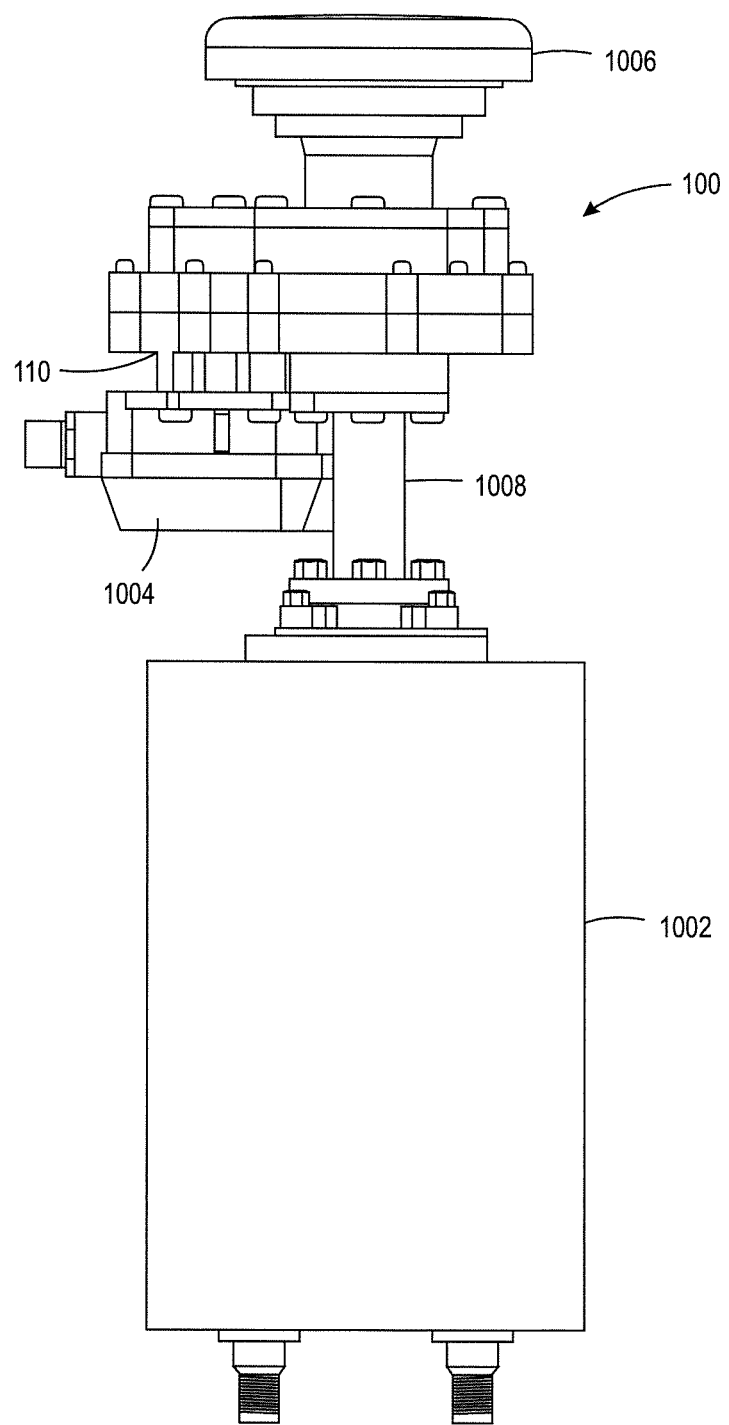
FIG. 10 illustrates a side view of the example multi-band transmit/receive feed of the present disclosure enclosed with a metal housing an coupled to a dual polarity transceiver.

FIG. 10 illustrates a side view of the multi-band transmit/receive feed 100 of the present disclosure enclosed with a metal housing 1008 and a lens 1006. The multi-band transmit/receive feed 100 may be coupled to a dual polarity transceiver 1002.

In one embodiment, the circular low frequency waveguide 128 of the low frequency combiner 110 may support both polarities of the low frequency band C that can be connected to a variety of device. One example device may be a dual polarity low noise block (LNB) down converter 1004 that is shown coupled to the low frequency combiner 110 in FIG. 10. The dual polarity LNB down converter 1004 may convert low frequency band C signals to an even lower frequency band F.

Figure 11:
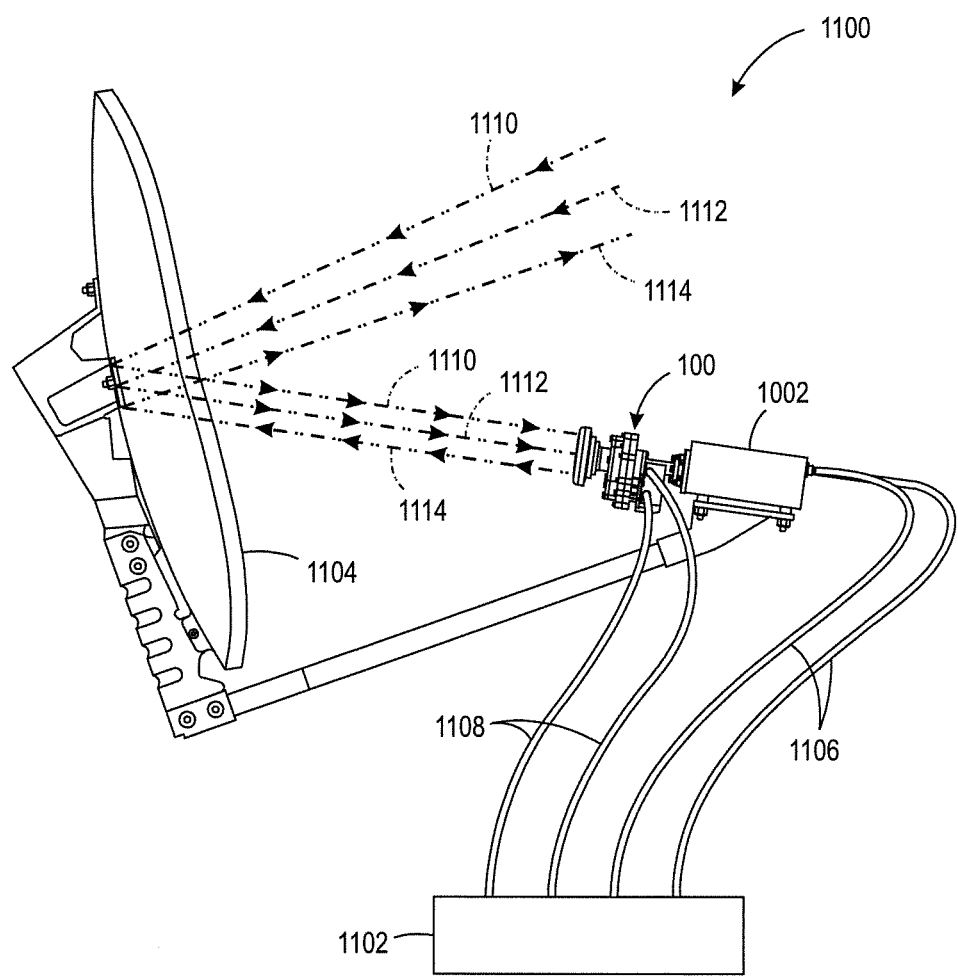
FIG. 11 illustrates a side view of the example multi-band transmit/receive feed of the present disclosure in a reflector antenna system.

FIG. 11 illustrates a side view of the multi-band transmit/receive feed 100 in a reflector antenna system 1100. In one embodiment, the reflector antenna system 1100 may include the multi-band transmit/receive feed 100, a reflector 1104 and a satellite receiver/modem set top box 1102. As noted above, the dual polarity LNB down converter 1004 may convert a low frequency band C signal 1110 (e.g., 10.7 GHz-12.75 GHz) into a lower frequency F band signal. The converted lower frequency F band signal may be sent through low cost long coaxial cables 1108 from the set top box 1102 to the set top box 1102.

In one embodiment, the high frequency waveguide 106 may support both polarities of a high frequency band B signal 1112 (e.g., 19.7 GHz-20.2 GHz) and a high frequency band A signal 1114 (e.g., 29.5 GHz-30 GHz). The high frequency waveguide 106 may be connected to a variety of devices including the dual polarity transceiver 1002. The dual polarity transceiver 1102 may convert the high frequency band B signal 1112 to a very low frequency band D signal that is sent through a low cost long coaxial cable 1106 to the set top box 1102.

The dual polarity transceiver 1102 may also convert a lower frequency band E signal coming from the set top box 1102 into the high frequency band A signal 1114. The high frequency band A signal 1114 may be sent from the dual polarity transceiver to the high frequency waveguide 114.

Several embodiments of the present disclosure provide excellent broad band linear polarity performance. For example, if the probes in the LNB 1004 are aligned with the probes 172, 174, 176, 178 in the low frequency waveguide 128, then the LNB 1004 efficiently receives both horizontal and vertical linear polarity signals.

Several embodiments of the present disclosure provide excellent broad band circular polarity performance. If the probes in the LNB 1004 are oriented at 45 degrees relative to the probes 172, 174, 176, 178 in the low frequency waveguide 128, then the LNB 1004 can efficiently receive both Right Hand and Left Hand circular polarity signals, provided that the distance z between the traces (and probes) on the two boards and the lengths of the traces 162, 164, 166, 168 are appropriately sized in order to create the needed 90 degree phase differential between orthogonal linear components that define each circular polarity signal. In other words, a length of the channels within each one of the plurality of printed circuits and/or a distance along a z-axis between two or more of the plurality of circuits may be set in combination with an additional circular polarizer mechanism comprising one of a variety of different shapes, as discussed below, to receive and/or transmit circular polarity signals.

Figure 29:
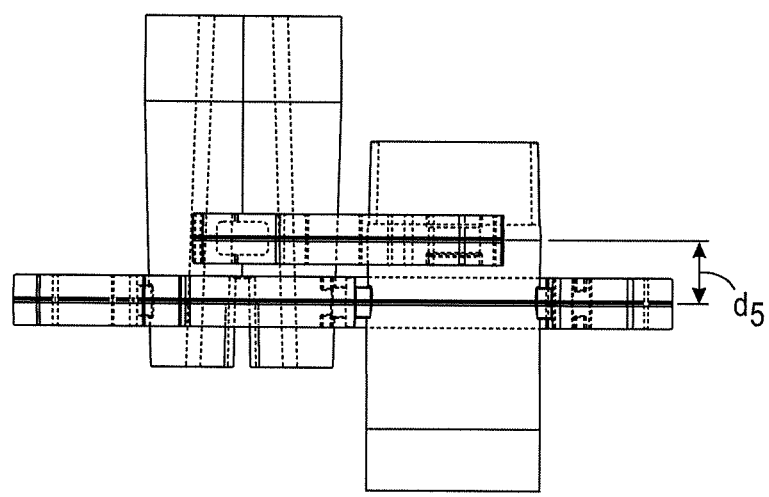
FIG. 29 illustrates a side view of the plurality of PCBs and a z height separation between the plurality of PCBs.

Furthermore, understanding the phase differential vs frequency response for each of the components and properly combining appropriately sized components can be used to provide extremely good circular polarity performance (e.g., low cross polarity levels) by maintaining 90 degree phase differential over significant frequency band width. In particular, the sizes can be chosen such that the phase differential (versus frequency response) between orthogonal linear components introduced in the coaxial and low frequency waveguides by the z distance $d_5$ (e.g., as shown in FIG. 29 and discussed below) between the boards is oppositely sloped compared to the phase differential (vs. frequency response) introduced by the difference in trace lengths.

FIGS. 12-26 illustrate different example designs of the air dielectric channels in the low frequency combiner 110 formed by the PCBs 130 and 132 and the metal housing portions 120, 122 and 124. The reference numerals have been re-numbered in FIGS. 12-26 for ease of explanation. However, the channel walls may correspond to the metal housing portions 120, 122 and 124 and the boards may refer to either the PCB 130 or 132.

FIG. 12 illustrates an isometric view 1202 and a cross-sectional view 1203 of a first example air dielectric channel. The first example air dielectric channel may be an air dielectric stripline having a double sided trace with vias. In one embodiment, the air dielectric channel may be formed by a board dielectric 1212 enclosed by a top channel wall 1204, a bottom channel wall 1206, a left side wall 1208 and a right side wall 1210.

In one embodiment, the top channel wall 1204 and the bottom channel 1206 may be closer to the top trace 1216 and the bottom trace 1218, respectively, then the left side wall 1208 and the right side wall. The fields may be contained in an air dielectric 1220 formed by the volume between the sides of the board dielectric 1212 and the top channel wall 1204, the bottom channel wall 1206, the left side wall 1208 and the right side wall 1210.

In one embodiment, the board dielectric 1202 may include one or more vias 1214. The board dielectric 1212 may include a top trace 1216 and a bottom trace 1218 on opposing sides of the board dielectric 1212. The vias 1214 may be formed through the board dielectric 1212 and used to connect the top trace 1216 and the bottom trace 1218 to effectively create a single thick conductor/trace. In one embodiment, a thickness of the board dielectric 1212 may be 0.20 inches (in) or greater or a thickness of 0.003 in or less. As a result, even when using conventional low cost board material, losses may be reduced by eliminating fields in the air dielectric 1220 directly between the top trace 1216 and the bottom trace 1218 between the line of vias 1214 on either side of the top trace 1216 and the bottom trace 1218. As a result, most of the fields may be concentrated in the low loss air dielectric 1220.

Figure 13:
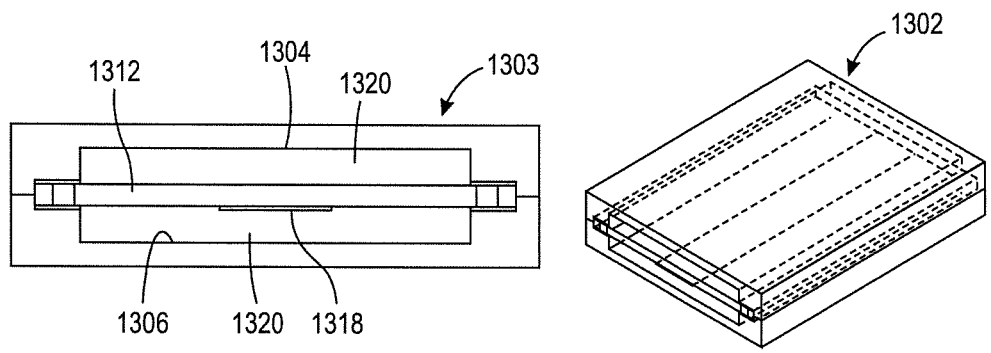
FIG. 13 illustrates a second example air dielectric transmission line.

FIG. 13 illustrates an isometric view 1302 and a cross-sectional view 1303 of a second example air dielectric channel. The second example air dielectric channel may be an air dielectric stripline with a single sided trace. The second example air dielectric channel may be substantially similar to the first example air dielectric channel except that a single trace 1318 may be used instead of two on each side of the dielectric board 1312.

FIG. 13 illustrates how a single sided trace can be also used resulting in the field between the single trace 1318 and a bottom channel wall 1306 of the channel passing through all air of the low loss air dielectric 1320. In contrast, the fields between the single trace 1318 and the top channel wall 1304 pass through both the low loss air dielectric 1320 and the dielectric board 1312, which may slightly increase loss. However, this loss can be reduced if a thickness of the dielectric board 1312 is reduced so the fields pass through less dielectric as shown in FIG. 14.

Figure 14:
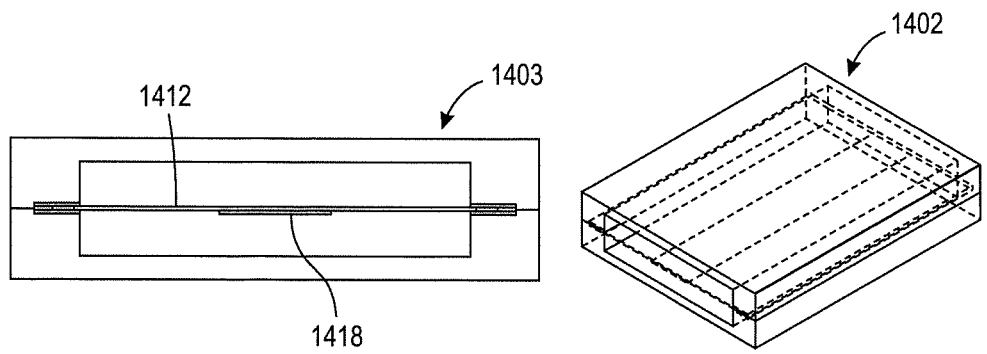
FIG. 14 illustrates a third example air dielectric transmission line.

FIG. 14 illustrates an isometric view 1402 and a cross-sectional view 1403 of a third example air dielectric channel. The third example air dielectric channel may be an air dielectric stripline with a single sided trace and a thin dielectric board. The third example air dielectric may be similar to the second example air dielectric channel except that the third example air dielectric may have a thin dielectric board 1412 with a single trace 1418. For example, the thickness of the thin dielectric board 1412 may be less than 0.0003 in, as noted above. Thus, the design of the third example air dielectric channel may be well suited for thin film substrates commonly used in flex circuits.

Figure 15:
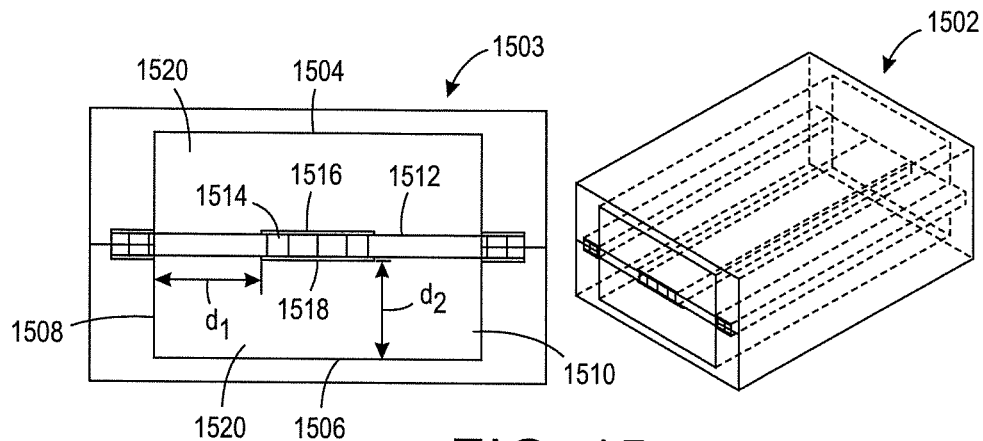
FIG. 15 illustrates a fourth example air dielectric transmission line.

FIGS. 12-14 illustrate essentially strip-line structures with air dielectrics where the distances between the traces and the side walls of the channel are significantly greater than the distances from the traces to the top channel wall or the bottom channel wall. FIG. 15 illustrates an isometric view 1502 and a cross-sectional view 1503 of a fourth example air dielectric channel. The fourth example air dielectric channel may be a primarily air dielectric quasi-stripline with a double sided trace.

In one embodiment, the air dielectric channel may be formed by a board dielectric 1512 enclosed by a top channel wall 1504, a bottom channel wall 1506, a left side wall 1508 and a right side wall 1510. The board dielectric 1512 may include a first trace 1516 and a second trace 1518 coupled to the board dielectric 1512 on opposing sides of the board dielectric 1512.

In the embodiment illustrated in FIG. 15, a distance $d_1$ between the left side wall 1508 or the right side wall 1510 and the first trace 1516 or the second trace 1518 may be approximately equal to a distance $d_2$ between the top channel wall 1504 or the bottom channel wall 1506 and the first trace 1516 or the second trace 1518. As a result, the fields may be distributed more uniformly in an air dielectric 1520 all around the first trace 1516 and the second trace 1518 forming a primarily air dielectric quasi-stripline transmission line with a small portion of the fields in the board dielectric 1512 on either side of the first trace 1516 or the second trace 1518.

Figure 16:
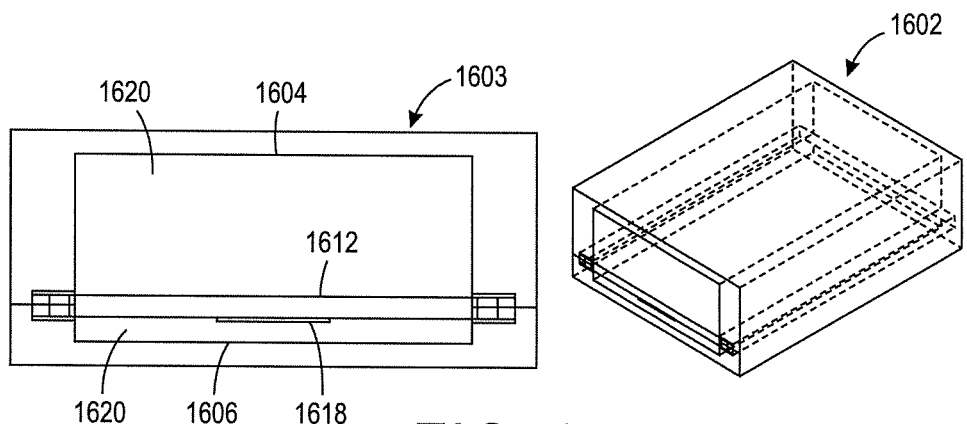
FIG. 16 illustrates a fifth example air dielectric transmission line.

FIG. 16 illustrates an isometric view 1602 and a cross-sectional view 1603 of a fifth example air dielectric channel. The fifth example air dielectric channel may be a primarily air dielectric micro-strip with a single sided trace. FIG. 16 illustrates an asymmetrical placement of the dielectric board 1612 and a single trace 1618. For example, a distance between a top channel wall 1604 and the single trace 1618 may be greater than a distance between a bottom channel wall 1606 and the single trace 1618. FIG. 16 illustrates that even with relatively thick dielectric boards 1612, the loss can be reduced with the asymmetrical placement of the dielectric board 1612. For example, the fields may become less concentrated in the air dielectric 1620 between the dielectric board 1612 and the top channel wall 1604 compared to the concentration of the fields in the air dielectric 1620 between the dielectric board 1612 and the bottom channel wall 1606.

Figure 17:
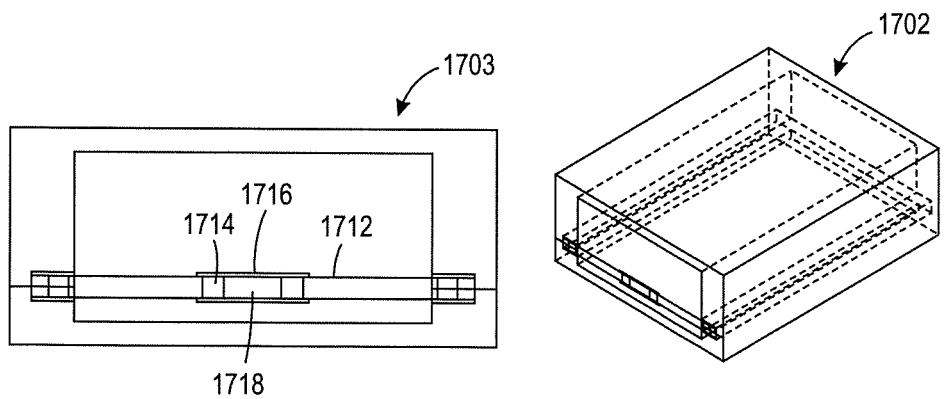
FIG. 17 illustrates a sixth example air dielectric transmission line.

FIG. 17 illustrates an isometric view 1702 and a cross-sectional view 1703 of a sixth example air dielectric channel. The sixth example air dielectric channel may be a primarily air dielectric micro-strip with a double sided trace. FIG. 17 illustrates an asymmetrically located dielectric board 1712. The dielectric board 1712 may have a first trace 1716 and a second trace 1718 on opposing sides of the dielectric board 1712 and one or more vias 1514.

Figure 18:
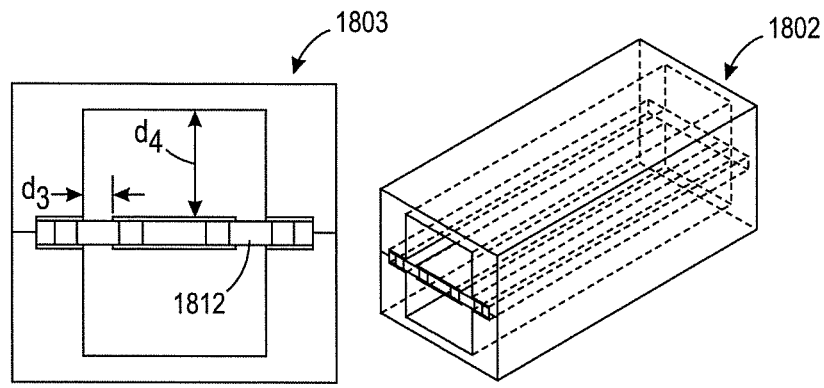
FIG. 18 illustrates a seventh example air dielectric transmission line.

FIG. 18 illustrates an isometric view 1802 and a cross-sectional view 1803 of a seventh example air dielectric channel. The seventh example air dielectric channel may be an air dielectric with a double sided trace. The seventh example air dielectric may have a distance $d_3$ between the sidewalls and the dielectric board that is less than a distance $d_4$ between the top or bottom channel walls and the dielectric board. The loss of the seventh example air dielectric channel may increase as the field concentration in a board dielectric 1812 that is lossy would increase compared to those in FIGS. 12 and 15, for example. Given the basic structure whether using "single sided traces" or "double sided traces with vias" the field concentration (density) between the trace and the channel walls is dependent upon the distance between the trace and the channel walls. The field concentration/density will be greater between the trace and channel wall(s) for those walls that are closer to the trace.

Figure 19:
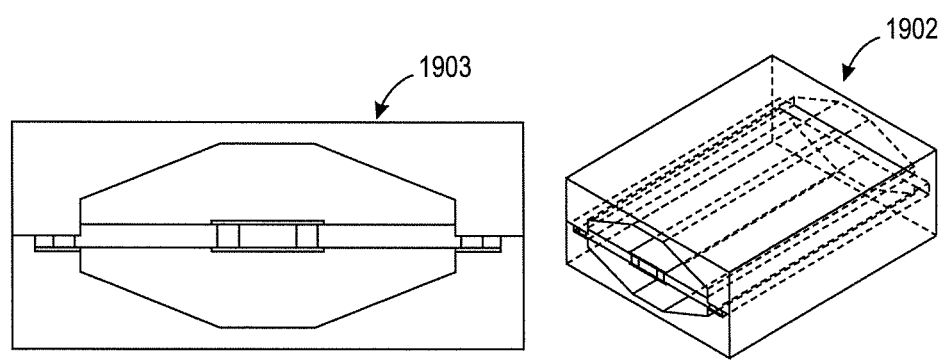
FIG. 19 illustrates an eighth example air dielectric transmission line.

It should also be noted that other channel cross section shapes (other than rectangular) could be used such as elliptical, circular, or any number of polygons, to name just a few. FIG. 19 illustrates an isometric view 1902 and a cross-sectional view 1903 of a different cross section shape.

Figure 20:
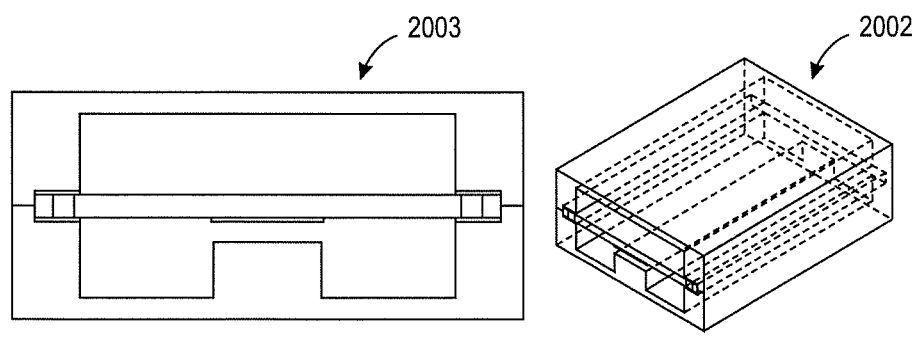
FIG. 20 illustrates a ninth example air dielectric transmission line.

In another example, the cross-section of the top channel and the cross section of the bottom channel that the board and trace sets between can be differently shaped as show in FIG. 20. FIG. 20 illustrates an isometric view 2002 and a cross-sectional view 2003 of a cross section of the top channel and the cross section of a bottom channel having different shapes. As a result, it should be noted that a wide variety of channel shapes can be chosen to implement a low loss primarily air dielectric cost effective transmission line using commonly available PCB, dielectric boards or flex circuit film or similar shape.

Figure 21:
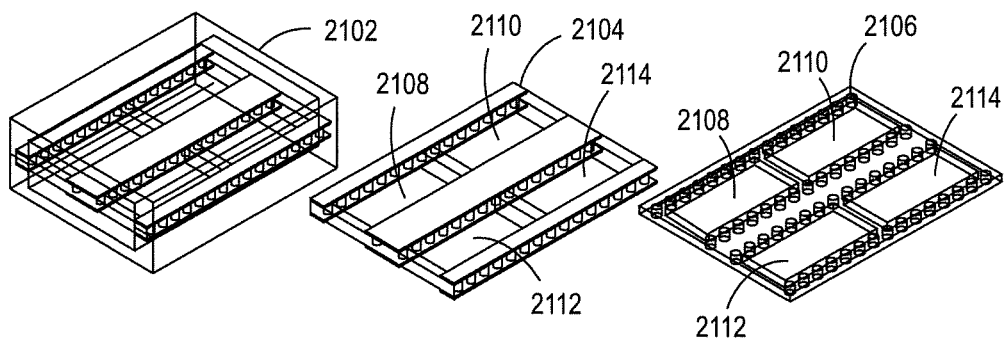
FIG. 21 illustrates an isometric view of an assembly of a tenth example air dielectric transmission line.
Figure 22:
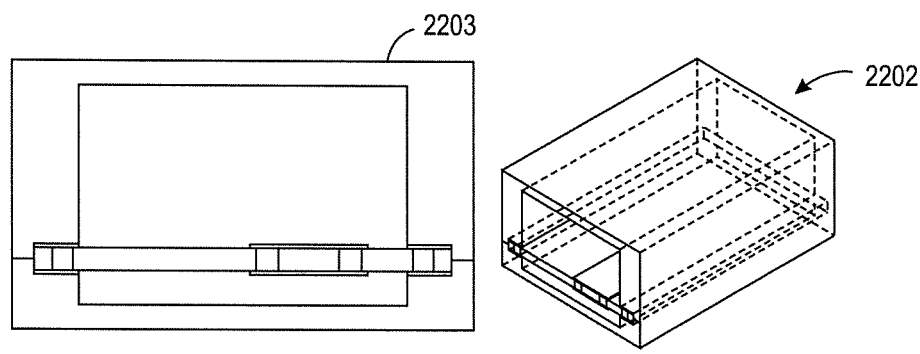
FIG. 22 illustrates an eleventh example air dielectric transmission line.

For many of the structures discussed above it should be noted that large portions of the PCB, or dielectric board, can be removed to further reduce loss as shown in FIG. 21. FIG. 21 illustrates various views 2102, 2104 and 2106 of the PCB or dielectric board that have large portions removed in areas 2108, 2110, 2112 and 2114. In addition, for any of the structures discussed above it should be noted that one side of the channel could be closer to the trace than the other if needed for a particular application as shown in an isometric view 2202 and a cross-sectional view 2203 in FIG. 22.

Figure 23:
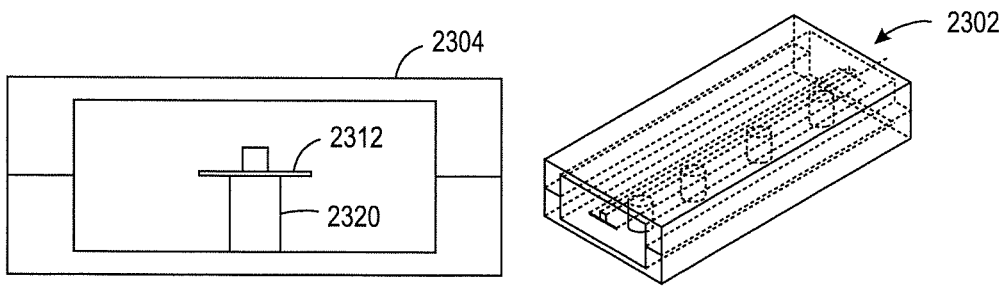
FIG. 23 illustrates a twelfth example air dielectric transmission line.

FIG. 23 illustrates an alternative to PCB or film. FIG. 23 illustrates an isometric view 2302 and a cross-sectional view 2303 a twelfth example air dielectric channel formed by a stamped metal. FIG. 23 illustrates a conductor 2312 formed by a stamped metal that is held in place by plastic supports 2320. FIG. 23 illustrates one example with plastic supports 2320 between the conductor 2312 and channel walls resulting in a primarily air dielectric stripline structure. Numerous other types of supports from any of the channel walls could be used to support the trace.

The embodiments of the air dielectric channel illustrated in FIGS. 12-23 provide a more robust design than conventional rectangular waveguides. The embodiments of FIGS. 12-23 are less susceptible to performance degradations even due to possible gaps in the side walls where the top and bottom castings mate (e.g., the top metal housing portion 120 and the middle housing portion 124 or the middle housing portion 124 and the bottom metal housing portion 122). For all of the above embodiments, the field concentrations leaking into the gaps are relatively small and therefore do not degrade performance very much. This is because the direction of the E-field near the gaps in the side walls is primarily perpendicular to the sidewalls (parallel to the top and bottom wall), making it less likely to leak into the gaps.

Furthermore, for embodiments where the conductor (e.g., the structure formed by the metal traces and the vias that connect the metal traces) is very close to the bottom wall compared to the other walls, the fields are concentrated between the conductor and the bottom walls so that almost no fields enter the gaps in the side walls. So gaps in the side walls degrade performance very little if at all. In fact, the sidewalls could in theory be completely removed and the fields would stay concentrated between trace and the bottom wall.

For embodiments where the conductor is very close to both the top wall and the bottom wall compared to the side walls, the fields may be concentrated between the conductor and the bottom wall and between the conductor and the top wall so that almost no fields enter the gaps in the side walls. So gaps in the side walls degrade performance very little if at all. In fact, the sidewalls could be completely removed and the fields would stay concentrated between the trace and the bottom wall.

Figure 31:
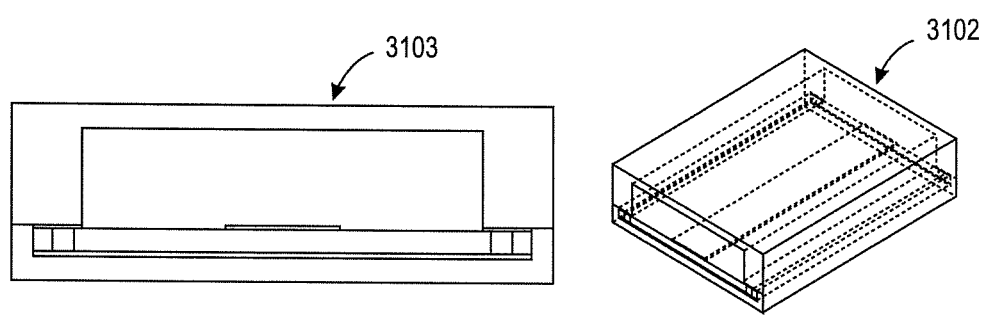
FIG. 31 illustrates views of an example micro-strip of the present disclosure.

As discussed above, some embodiments use some form of a primarily air filled low loss transmission line where most of the fields are concentrated in the air resulting in relatively low loss. However, as shown in FIG. 31, a micro-strip can be used where most of the fields are contained within the relative higher loss board dielectric, resulting in a relatively high loss transmission line. FIG. 31 illustrates an isometric view 3102 and a cross-sectional view 3103 of a micro-strip.

Although the higher loss is generally not desired, the embodiment illustrated in FIG. 31 has two advantages. First, the space, and therefore the material, needed to support the transmission line can be reduced (e.g., due to the higher dielectric lowering "shortening" the propagation wavelength. Second, the middle metal housing 124 can be eliminated because the ground plane on the micro-strip boards separates and isolates the transmission lines and fields for the two polarities. Although not shown, the conventional strip-line could also be used where, for each polarity, all of the fields are contained within the board dielectric between the centered trace and top and bottom ground planes.

Figure 24:
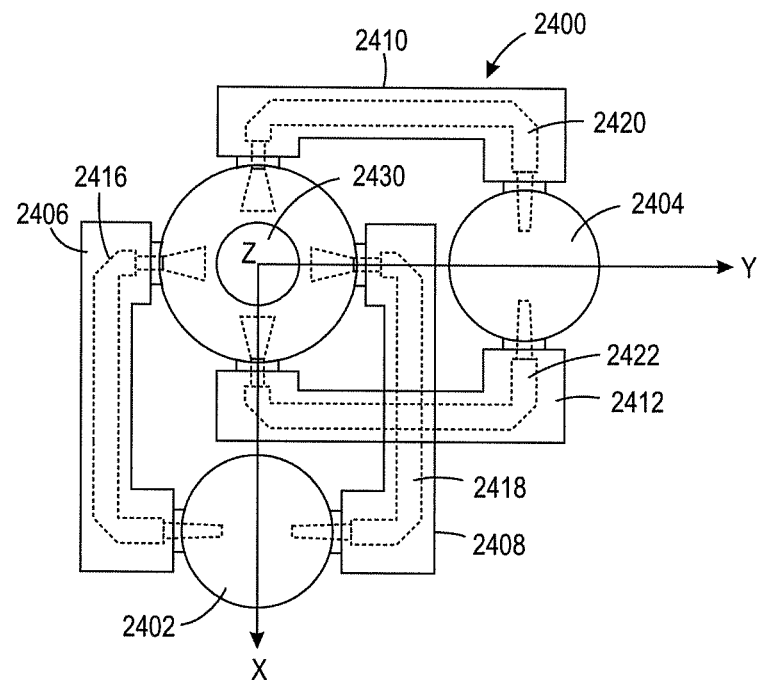
FIG. 24 illustrates a top view of the example multi-band transmit/receive feed of the present disclosure with two KU waveguide ports.

FIG. 24 illustrates a top view of an example multi-band transmit/receive feed 2400 with two KU waveguide ports 2402 and 2404. The multi-band transmit/receive feed 2400 may have two circular low frequency waveguide ports. The KU waveguide port 2402 may be located at the first circular low frequency waveguide port and the KU waveguide port 2404 may be located at the second circular low frequency waveguide port.

In one embodiment, the KU waveguide port 2402 may support a first KU polarity, while the KU waveguide port 2404 may support a second KU polarity. The advantage of this embodiment is that channels 2406, 2408, 2410 and 2412 and respective traces 2416, 2418, 2420 and 2422 between a coaxial waveguide 2430 and the KU waveguide ports 2402 and 2404 can be somewhat shorter than the channels and traces in the embodiment illustrated in FIG. 1. This results in slightly less loss, however it requires the LNB to have 2 physically separated ports increasing the size and cost of the LNB.

Figure 25:
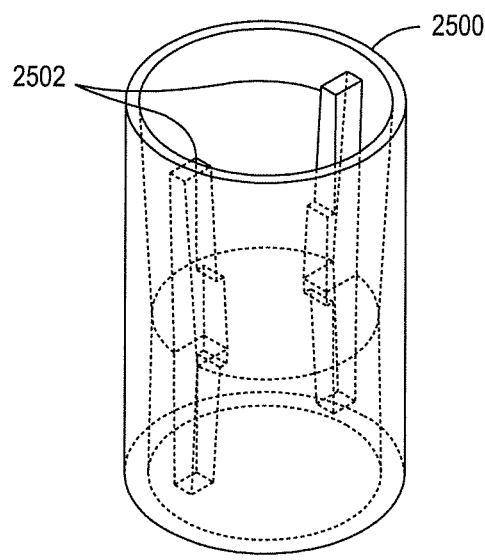
FIG. 25 illustrates an example circular polarizer mechanism that supports two low band circular polarities.
Figure 26:
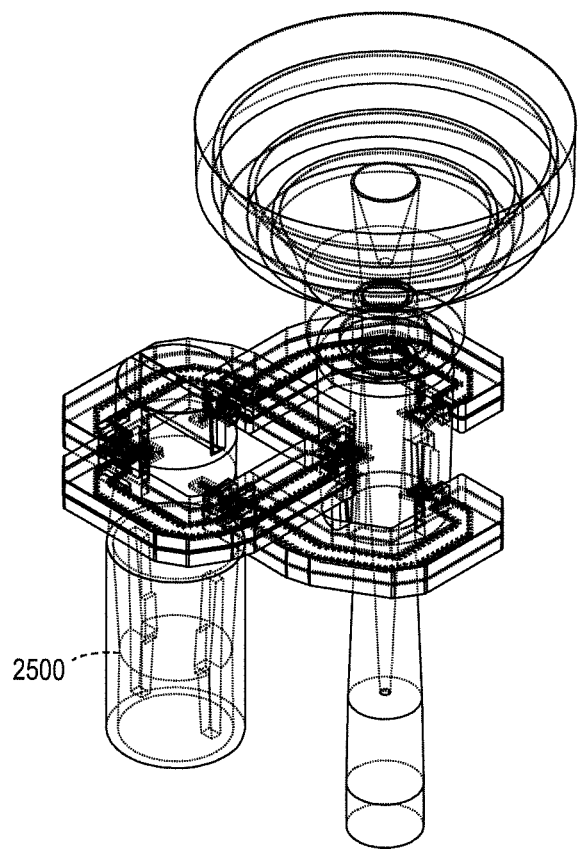
FIG. 26 illustrates an isometric view of the example circular polarizer mechanism coupled to the low frequency combiner.

The embodiments of FIGS. 1 and 24 may support two low band linear polarities. However, with an addition of a circular polarity polarizer mechanism in the KU waveguide between the combiner 110 and LNB 1004 of the embodiment of FIG. 1, two low band circular polarities can be supported. If a circular polarity polarizer mechanism is added to both KU waveguides of the embodiment of FIG. 24 then two low band circular polarities can be supported. FIG. 25 illustrates an example circular polarizer mechanism 2500. The circular polarizer mechanism 2500 may include a pair of double ridge polarizers 2502. The pair of double ridge polarizers may be integrated into either the bottom casting of the combiner 110 or the LNB 1004 casting as illustrated in FIG. 26.

In one embodiment, the circular polarity polarizer mechanism can be aligned with either the probes 172 and 174, or the probes 176 and 178. In order to receive circular polarity LNB probes are oriented at 45 degrees relative to the additional CP mechanism and relative to probes 172 and 174, or 176 and 178. This additional mechanism is not typically required for most applications, but does add another degree of freedom to achieve excellent broad band circular polarity performance.

Figure 27:
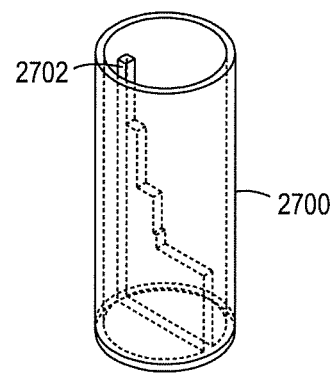
FIG. 27 illustrates a second example circular polarizer mechanism that supports two low band circular polarities.

FIG. 27 illustrates another example of a circular polarizer 2700. The circular polarizer 2700 may include a septum structure 2702. The circular polarizer 2700 may be coupled to the bottom casting of the combiner 110 or the LNB 1004 casting similar to the circular polarizer 2500 as illustrated in FIG. 26.

It should be noted that FIGS. 25 and 27 illustrate a few example polarizer mechanisms or structures that may be implemented. Numerous other polarizer structures could be used including oblong (elliptical, rectangular, or other) waveguides with single, dual, or quad ridges, or simply oblong waveguides, or oblong dielectric vanes in the axisymmetric or oblong waveguides, or dielectrics that line some, or portions, of the waveguide walls, to name just a few.

Circular polarity can be defined as the vector sum of two orthogonal (90 apart in space) linear components that are also 90 degrees out of phase. Mechanisms that introduce a 90 degree phase lead or lag in one orthogonal linear component relative to the other orthogonal linear component will convert circular polarity signals to linear polarity signals that the LNB can receive.

Figure 28:
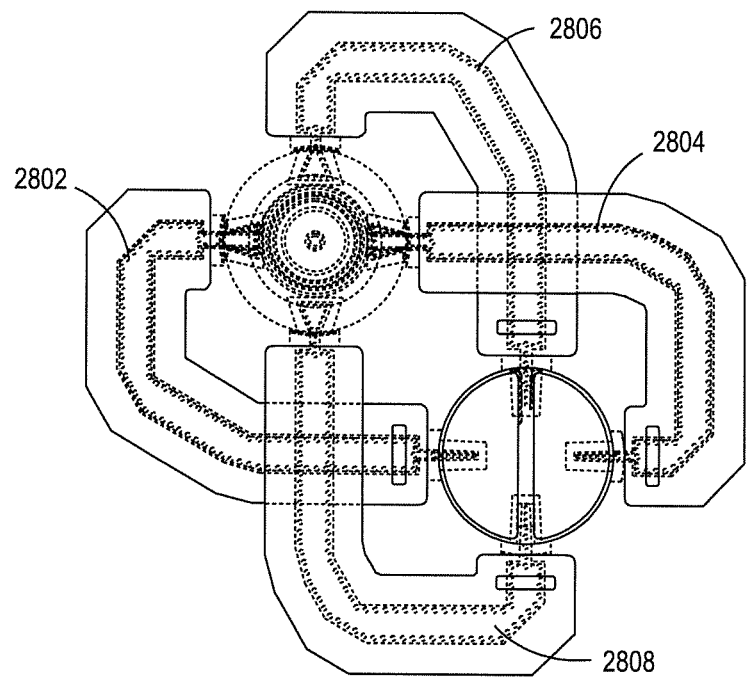
FIG. 28 illustrates a top view of the plurality of PCBs.

The embodiment in FIGS. 28 and 29 illustrate examples based on varying lengths of traces 2802, 2804, 2806 and 2808 and a z distance $d_5$. In one example, the lengths of the traces 2802 and 2804 that support linear polarity (LP) component 1 are equal to the lengths of the traces 2806 and 2808 that support the orthogonal LP component 2, so no differential phase is introduced by the traces 2802, 2804, 2806 and 2808. However, the traces 2802 and 2804 that support the LP component 1 and the traces 2806 and 2808 that support the LP component 2 may be separated by the distance $d_5$ along the z-axis illustrated in FIG. 29. As a result, the LP component 2 travels the distance $d_5$ more in the coaxial waveguide while the LP component 1 travels the distance $d_5$ more in the low frequency circular guide. The phase velocity and corresponding wavelength ($\lambda g$) inside the circular waveguide changes considerably more as a function of operating frequency (f) than it does inside the coaxial waveguide.

Figure 30:
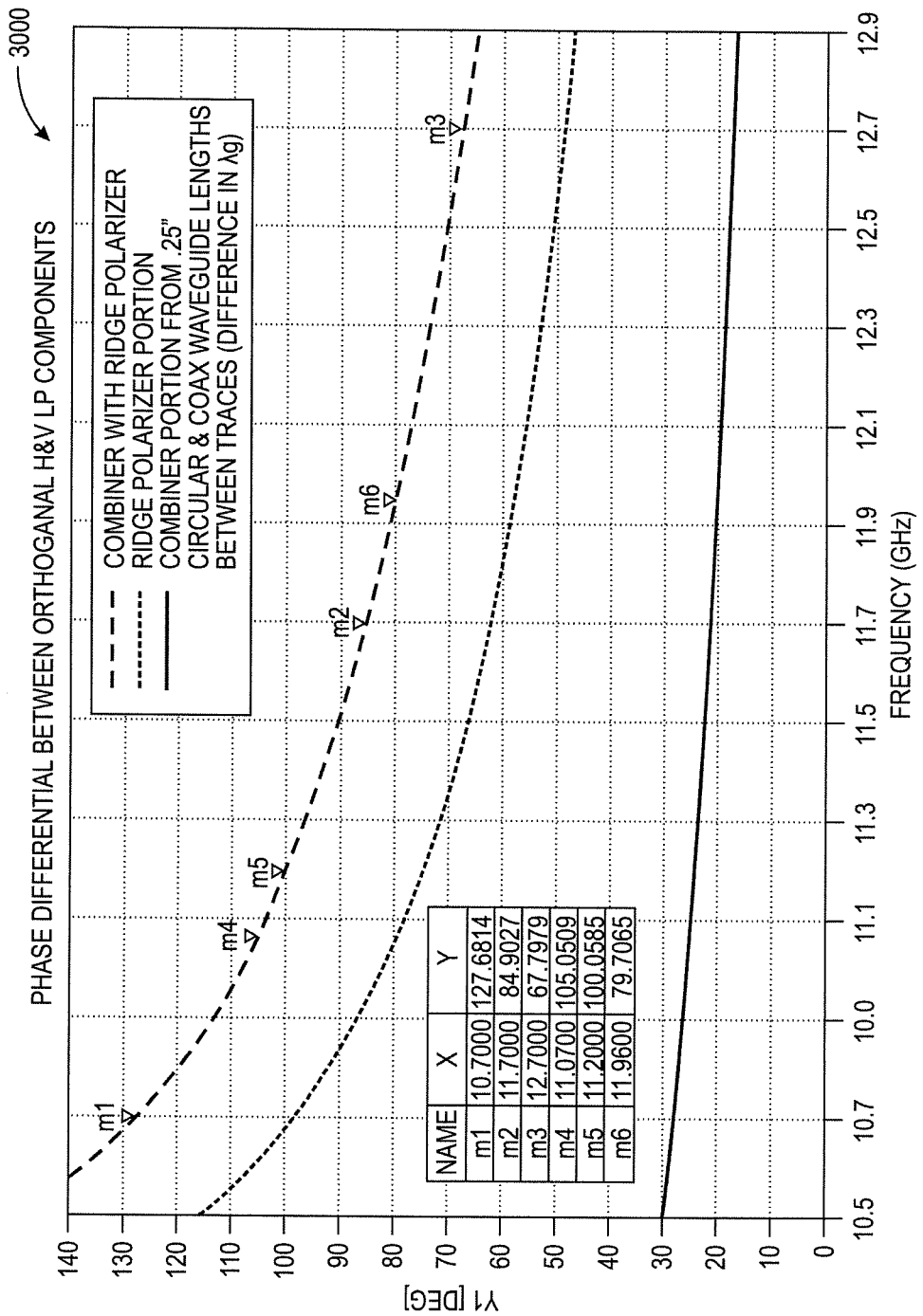
FIG. 30 illustrates a graph of phase differential between orthogonal horizontal and vertical linear polarity components.

In one embodiment, FIG. 30 illustrates a graph 3000 that illustrates a resulting phase differential that may be introduced by the substantial length of the distance $d_5$ of the low frequency circular waveguide, the phase differential introduced by the circular polarizer mechanism 2500 with the pair of double ridge polarizers 2502, and the resulting sum total phase differential. Perfect conversion of circular polarity signal to linear polarity occurs when the sum total phase differential is 90 degrees. As shown by the graph 3000, the phase differential versus frequency that is introduced by the pair of double ridged polarizers 2502 may be sloped in the same direction as the phase differential introduced by the distance $d_5$ between the traces 2802 and 2804 that support the LP component 1 and the traces 2806 and 2808 that support the LP component 2. As a result, the resulting sum total phase differential vs. frequency is very sloped, which severely limits the CP band width performance.

As shown in the graph 3000, the sum total phase differential is close to 90 degrees over part of the band but near the band edges (e.g., at 10.7 GHz and 12.7 GHz) the phase differential is significantly different than 90 degrees, which as illustrated in the graph 3000 results in very poor radiated CP Xpol performance over a wide frequency band when combined with Horn radiating structures. Most satellite applications require −20 to −25 CP Xpol performance. This example provides −20 dB CP Xpol or better, for only a relatively narrow frequency band of 11.2 to 11.95 GHz, and has very poor CP Xpol of −9.7 dB at 10.7 GHz and −14.7 dB at 12.7 GHz.

In various embodiments, changing the length of the traces 2802, 2804, 2806 and 2808 and the distance $d_5$ in FIGS. 28 and 29 may vary the performance of the multi-band transmit/receive feed 100. For example, the lengths of traces 2802 and 2804 that support linear polarity component 1 may be equal to the lengths of the traces 2806 and 2808 that support linear polarity component 2. As a result, no differential phase is introduced by the lengths of the traces 2802, 2804, 2806 and 2808. In addition, the traces 2802, 2804, 2806 and 2808 may be separated by a very small distance $d_5$ along the z axis so the resulting phase differential introduced by linear polarity component 1 traveling a slightly longer distance than linear polarity component 2 in the circular wave guide is very small. So in this case the additional circular polarity mechanism (ridge polarizer in this example) introduces most of the needed 90° phase differential. This may lead to a phase differential that is close to 90 deg over part of the band, but near the band edges (10.7 GHz, and 12.7 GHz) the phase differential is significantly different than 90 degrees. This may result in poor CP conversion, specifically substantially degraded CP Xpol performance. It should be noted that most conventional CP polarizer mechanisms also have significant band width performance limitations.

As noted above, understanding the phase differential vs frequency response for each of the components and properly combining appropriately sized components can be used to provide extremely good circular polarity performance (e.g., low cross polarity levels) by maintaining 90 degree phase differential over significant frequency band width. In particular, the sizes can be chosen such that the phase differential (versus frequency response) between orthogonal linear components introduced in the coaxial and low frequency waveguides by the z distance $d_5$ between the boards is oppositely sloped compared to the phase differential (vs. frequency response) introduced by the difference in trace lengths, specifically the difference in lengths of traces 2802 and 2804 compared to the lengths of traces 2806 and 2808.

Figure 32:
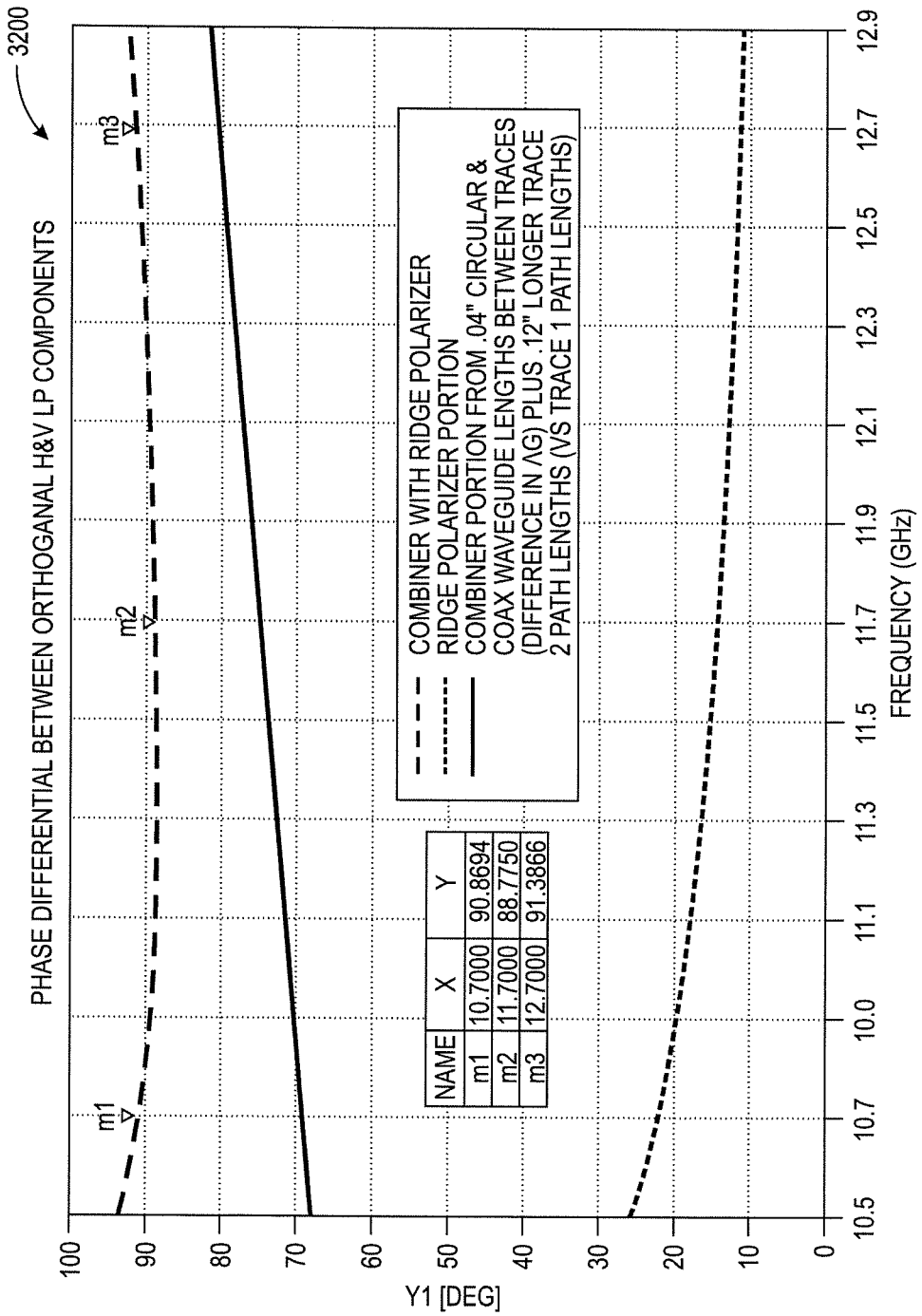
FIG. 32 illustrates a second graph of phase differential between orthogonal horizontal and vertical linear polarity components.

Some embodiments of this disclosure overcome the limited bandwidth performance by greatly reducing the slope of the phase differential vs frequency response, resulting in phase differential remaining close to 90 degrees over a much broader frequency band. For example, this may be accomplished by introducing a portion of the needed phase differential by separating the traces for the LP components a distance $d_5$ (e.g., approximately 0.04 inches) in the z direction, while making the lengths of traces 2806 and 2808 that support LP component 2 longer (e.g., by approximately 0.12 inches) than the lengths of traces 2802 and 2804 that support orthogonal LP component 1, and by using a ridge polarizer section to introduce another portion of the phase differential. This difference in trace length introduces a phase differential vs frequency response that is oppositely sloped compared to the phase differential introduced by the ridge polarizer section. The result may be a total phase differential vs frequency that has a relatively flat slope over a very wide band, remaining very close to 90 degrees, which will by definition, result in very good CP Xpol performance over a wide frequency band, as shown by graph 3200 in FIG. 32.

Figure 33:
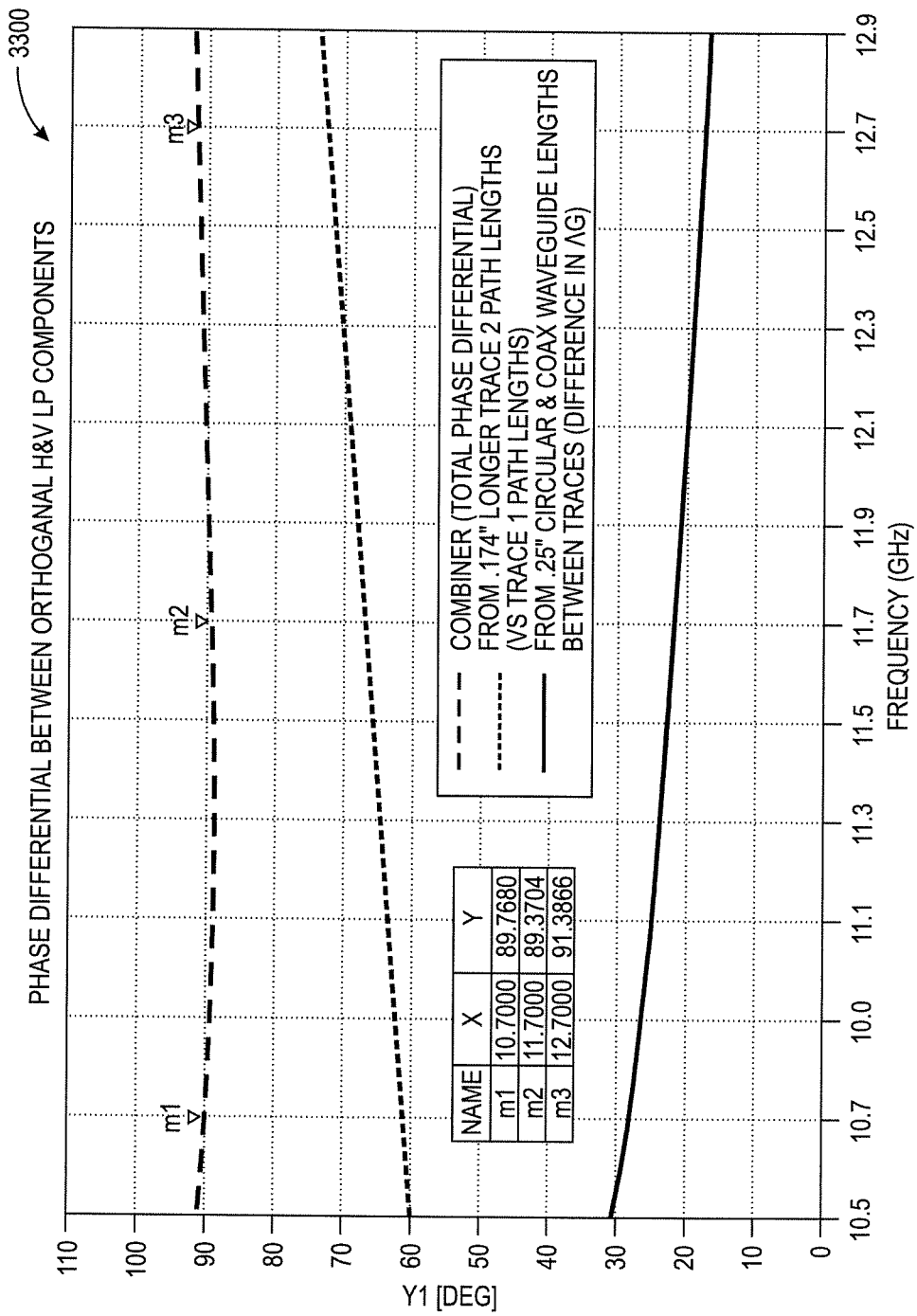
FIG. 33 illustrates a third graph of phase differential between orthogonal horizontal and vertical linear polarity components.

Another embodiment of the present disclosure overcomes the limited bandwidth circular polarity performance and eliminates the need for the additional CP polarity mechanism (ridges, septums etc.). In one embodiment, this may be accomplished by both separating the traces for the 2 orthogonal LP components a distance $d_5$ (e.g., approximately 0.25 inches) in the z direction, while at the same time making the lengths of traces 2806 and 2808 that support LP component 2 longer (e.g., approximately 0.174 inches) than the lengths of traces 2802 and 2804 that support orthogonal LP component 1. The phase differential vs frequency introduced by the difference in trace lengths is oppositely sloped from that of the phase differential vs frequency introduced by the distance $d_5$ as shown by graph 3300, in FIG. 33. The resulting total phase differential vs frequency may have a relatively flat slop over a very wide band, remaining very close to 90 degrees. This may lead to very good radiated CP Xpol performance over a wide frequency band when combined with appropriated Horn radiating structures. For this example the CP Xpol performance is better than −34 dB over the entire desired frequency band providing excellent margin over the typical −20 to −25 dB CP X-pol that most satellite applications require.

It should be noted that reciprocity applies to passive systems so if instead a Low band transmitter replaced the LNB receiver then the two outgoing linear polarities from the low band transmitter would be converted to circular polarity and radiated out of the Horn.

In contrast to using conventional rectangular waveguide, the smaller channel widths of the present disclosure allows the low wavelength combiner (e.g., the low wavelength combiner 110) to be considerably smaller improving aesthetics and reducing cost. When formed into bends or when interfaced with other structures (like the probes inside the coaxial waveguide and circular waveguide), the inherent broad band characteristics of these transmission lines make it easier to obtain good return loss or match (in comparison to conventional waveguide), especially over wider frequency bands.

Conventional rectangular waveguides can be used in two possible orientations. One orientation has the broad side of the waveguide in the plan parallel to the combiner which provides a relatively flat structure. As a high volume low cost assembly this would be cast into several layered casting with splits (mating surfaces) along the narrow wall of the wave guide where the castings would bolt together to form the waveguides. This is problematic because gaps might occur at the seams significantly degrading performance by increasing loss, leakage, and possibly even creating unwanted resonances. If/when that happens it fundamentally changes the propagation characteristics of the waveguide transmission line structure introducing unwanted discontinuities. This is particularly damaging for conventional rectangular waveguide given the orientation of the fields within it. The fields near the narrow wall are perpendicular to the broad wall and parallel to the narrow wall, so the fields can easily enter gaps in the narrow wall (between the mating surfaces of the cast pieces). When such gaps open up, the gaps effectively change the width of the waveguide structure increasing the field concentrations near the narrow wall and inside the unwanted gap, where energy can leak or create unwanted resonances which can be very damaging to performance. If other metal structures are present in close proximity to the waveguide the energy could leak back into the waveguide out of phase creating resonances significantly increasing the insertion loss at some frequencies and drastically degrading performance.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus, comprising:
   a low frequency radiator;
   a high frequency radiator;
   a high frequency waveguide that carries high frequency bands to the high frequency radiator;
   a low frequency coaxial waveguide coupled to the high frequency waveguide in a coaxial structure, wherein the low frequency coaxial waveguide carries low frequency bands to the low frequency radiator; and
   a low frequency combiner in communication with the low frequency coaxial waveguide, wherein the low frequency combiner comprises a circular low frequency waveguide and air dielectric transmission lines formed by air channels formed above and below a plurality of printed circuits in a metal housing, wherein the air dielectric transmission lines comprise:
      a top metal housing portion of the metal housing;
      a first printed circuit of the plurality of printed circuits;
      a middle housing portion of the metal housing coupled to the top metal housing portion to form first air channels above and below the first printed circuit within a volume formed by the top metal housing portion and the middle housing portion;
      a second printed circuit of the plurality of printed circuits; and
      a bottom metal housing portion of the metal housing coupled to the middle housing portion to form second air channels above and below the second printed circuit within a volume formed by the middle housing portion and the bottom metal housing portion.

2. The apparatus of claim 1, further comprising a high frequency interface port in communication with the high frequency waveguide to receive the high frequency bands.

3. The apparatus of claim 1, wherein the low frequency combiner comprises a low frequency interface port in communication with the circular low frequency waveguide to receive the low frequency bands.

4. The apparatus of claim 1, wherein the plurality of printed circuits are printed on a printed circuit board (PCB) or a thin film.

5. The apparatus of claim 4, wherein the PCB comprises micro-strip printed circuits or stripline printed circuits.

6. The apparatus of claim 1, wherein the first printed circuit carries a first polarity of the low frequency bands and the second printed circuit carries a second polarity of the low frequency bands.

7. The apparatus of claim 1, wherein the first printed circuit comprises:
   a first metal trace;
   a second metal trace;
   a first probe coupled to a first end of the first metal trace;
   a second probe coupled to a second end of the first metal trace;
   a third probe coupled to a first end of the second metal trace, wherein the third probe is located opposite the first probe; and
   a fourth probe coupled to a second end of the second metal trace, wherein the fourth probe is located opposite the second probe.

8. The apparatus of claim 7, wherein a length of the first metal trace is equal to a length of the second metal trace.

9. The apparatus of claim 7, wherein the first metal trace and the second metal trace are on a single side of the first printed circuit.

10. The apparatus of claim 7, wherein the first metal trace and the second metal trace comprise duplicate traces on an opposing side of the first printed circuit, wherein the first metal trace and the second metal trace are connected to the duplicate traces via a plurality of platted through vias.

11. The apparatus of claim 10, wherein the plurality of platted through vias align with an outer perimeter of the air channels that contain the first metal trace and the second metal trace.

12. The apparatus of claim 7, wherein the second printed circuit comprises:
   a third metal trace;

a fourth metal trace;
a fifth probe coupled to a first end of the third metal trace;
a sixth probe coupled to a second end of the third metal trace
a seventh probe coupled to a first end of the fourth metal trace, wherein the seventh probe is located opposite the fifth probe; and
an eighth probe coupled to a second end of the fourth metal trace, wherein the eighth probe is located opposite the sixth probe.

13. The apparatus of claim 12, wherein a length of the third metal trace is equal to a length of the fourth metal trace.

14. The apparatus of claim 12, wherein the third metal trace and the fourth metal trace are on a single side of the second printed circuit.

15. The apparatus of claim 12, wherein the third metal trace and the fourth metal trace comprise duplicate traces on an opposing side of the second printed circuit, wherein the third metal trace and the fourth metal trace are connected to the duplicate traces via a plurality of platted through vias.

16. The apparatus of claim 15, wherein the plurality of platted through vias align with an outer perimeter of the air channels that contain the third metal trace and the fourth metal trace.

17. The apparatus of claim 12, wherein the first probe and the third probe are located approximately 90 degrees relative to the fifth probe and the seventh probe around a perimeter of a first opening and the second probe and the fourth probe are located approximately 90 degrees relative to the sixth probe and the eighth probe around a perimeter of a second opening, wherein the coaxial structure of the high frequency waveguide and the low frequency coaxial waveguide is located through the first opening and the circular low frequency waveguide is located through the second opening.

18. The apparatus of claim 1, wherein a length of channels within each one of the plurality of printed circuits, a distance along a z-axis between two or more of the plurality of printed circuits, or a combination of the length and the distance, are set in combination with an additional circular polarizer mechanism comprising at least one of: ridges, septums, oblong waveguides, or dielectric vanes to receive or to transmit circular polarity signals.

19. The apparatus of claim 1, wherein a length of channels within each one of the plurality of printed circuits and a distance along a z-axis between two or more of the plurality of printed circuits are set to receive or to transmit circular polarity signals.

* * * * *